(12) United States Patent
Halyal et al.

(10) Patent No.: US 11,942,798 B2
(45) Date of Patent: *Mar. 26, 2024

(54) WIRELESS CHARGING IN EYEWEAR WITH ENHANCED POSITIONAL FREEDOM

(71) Applicant: NuCurrent, Inc., Chicago, IL (US)

(72) Inventors: Pratik Halyal, Chicago, IL (US); Pavel Shostak, San Diego, CA (US); Alberto Peralta, Chicago, IL (US)

(73) Assignee: NuCurrent, Inc., Chicago, IL (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/878,576

(22) Filed: Aug. 1, 2022

(65) Prior Publication Data

US 2023/0017240 A1 Jan. 19, 2023

Related U.S. Application Data

(63) Continuation of application No. 16/934,680, filed on Jul. 21, 2020, now Pat. No. 11,404,918.

(51) Int. Cl.
*H02J 50/50* (2016.01)
*H02J 50/00* (2016.01)
*H02J 50/27* (2016.01)
*H02J 50/90* (2016.01)

(52) U.S. Cl.
CPC .......... *H02J 50/502* (2020.01); *H02J 50/005* (2020.01); *H02J 50/27* (2016.02); *H02J 50/90* (2016.02)

(58) Field of Classification Search
CPC ........... H02J 50/502; H02J 50/27; H02J 50/90
See application file for complete search history.

(56) References Cited

U.S. PATENT DOCUMENTS

| | | |
|---|---|---|
| 6,591,139 B2 | 7/2003 | Loftin et al. |
| 9,919,610 B1 | 3/2018 | Sarwat et al. |
| 10,509,466 B1 | 12/2019 | Miller et al. |

(Continued)

FOREIGN PATENT DOCUMENTS

| | | |
|---|---|---|
| KR | 20120078995 A | 7/2012 |
| KR | 20150050076 A | 5/2015 |

(Continued)

OTHER PUBLICATIONS

International Searching Authority, PCT International Search Report and Written Opinion, PCT International Application No. PCT/US2021/039443 dated Oct. 19, 2021, 9 pages.

(Continued)

*Primary Examiner* — Daniel Cavallari
(74) *Attorney, Agent, or Firm* — Lee Sullivan Shea & Smith LLP

(57) ABSTRACT

Eyewear and receptacles for housing such eyewear include components of a wireless power transfer system. The eyewear includes a receiver system for receiving power from a transmission system associated with the receptacle(s). The receiver system includes at least one receiver antenna, for receiving wireless power from the transmission system, and a repeater antenna for repeating the wireless power signal to the receiver antenna. The receiver antenna is positioned proximate to a first arm of the eyewear and the repeater is positioned proximate to a second arm of the eyewear. Positioning of the receiver and repeater antennas allows for positional freedom of the eyewear and/or the arms of the eyewear, when mechanically received by the receptacle.

18 Claims, 21 Drawing Sheets

(56) References Cited

U.S. PATENT DOCUMENTS

| | | |
|---|---|---|
| 10,649,238 B2 | 5/2020 | Rousseau |
| 11,218,026 B1 | 1/2022 | Hansen et al. |
| 2005/0118971 A1 | 6/2005 | Arai et al. |
| 2010/0253310 A1 | 10/2010 | Fonderie |
| 2011/0217927 A1 | 9/2011 | Ben-Shalom et al. |
| 2011/0222154 A1 | 9/2011 | Choi et al. |
| 2012/0086512 A1 | 4/2012 | Sharma et al. |
| 2013/0039395 A1 | 2/2013 | Norconk et al. |
| 2013/0099586 A1 | 4/2013 | Kato |
| 2013/0321055 A1 | 12/2013 | Gagne et al. |
| 2014/0152253 A1 | 6/2014 | Ozaki et al. |
| 2014/0300199 A1 | 10/2014 | Shichino et al. |
| 2015/0194811 A1 | 7/2015 | Mao |
| 2015/0357907 A1 | 12/2015 | Koo |
| 2016/0094042 A1 | 3/2016 | Maniktala et al. |
| 2016/0197511 A1 | 7/2016 | Atasoy et al. |
| 2016/0197512 A1 | 7/2016 | Song et al. |
| 2016/0204646 A1 | 7/2016 | Park et al. |
| 2016/0241046 A1 | 8/2016 | Lee et al. |
| 2016/0261314 A1 | 9/2016 | Cox et al. |
| 2018/0097401 A1 | 4/2018 | Gaskill et al. |
| 2019/0033622 A1 | 1/2019 | Olgun et al. |
| 2019/0109498 A1 | 4/2019 | Stingu et al. |
| 2019/0255965 A1 | 8/2019 | Hocke et al. |
| 2019/0318589 A1 | 10/2019 | Howell et al. |
| 2020/0133030 A1 | 4/2020 | Eriksson et al. |
| 2020/0244236 A1 | 7/2020 | Hwang et al. |
| 2020/0313454 A1 | 10/2020 | Ma |
| 2021/0012176 A1 | 1/2021 | Freitas et al. |
| 2021/0143672 A1 | 5/2021 | Moubedi et al. |

FOREIGN PATENT DOCUMENTS

| | | |
|---|---|---|
| KR | 20160084152 A | 7/2016 |
| KR | 102087300 B1 | 3/2020 |
| WO | 2008101151 A2 | 8/2008 |
| WO | 2017052158 A1 | 3/2017 |

OTHER PUBLICATIONS

International Searching Authority, PCT International Search Report and Written Opinion, PCT International Application No. PCT/US2021/042575 dated Nov. 11, 2021, 8 pages.

International Searching Authority, PCT International Search Report and Written Opinion, PCT International Application No. PCT/US2022/014405 dated May 13, 2022, 10 pages.

International Searching Authority, PCT International Search Report and Written Opinion, PCT International Application No. PCT/US2022/040934 dated Dec. 1, 2022, 9 pages.

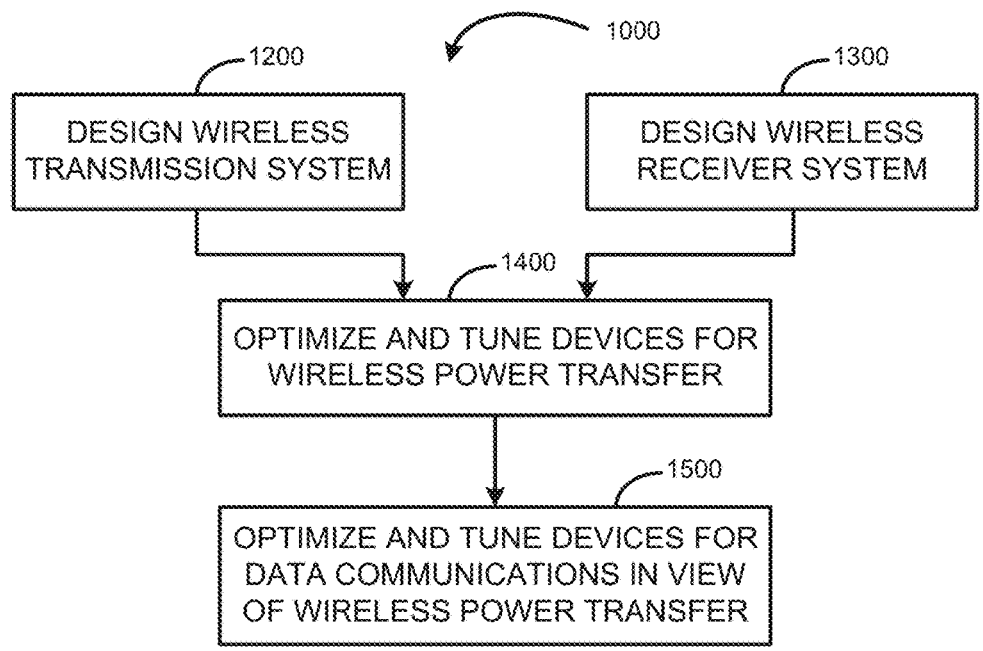
FIG. 17
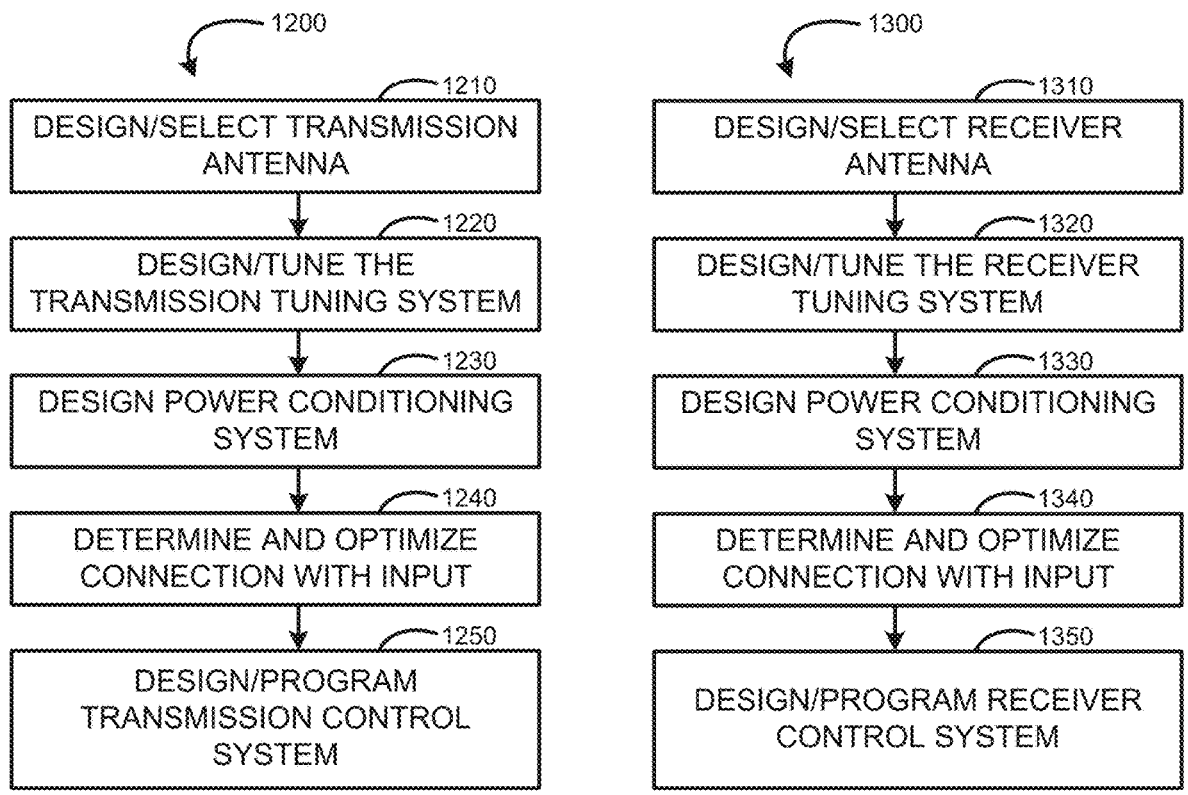
FIG. 18
FIG. 19

WIRELESS CHARGING IN EYEWEAR WITH ENHANCED POSITIONAL FREEDOM

CROSS-REFERENCE TO RELATED APPLICATIONS

This application is a continuation of, and claims priority to, U.S. Non-Provisional application Ser. No. 16/934,680, filed on Jul. 21, 2020, and entitled "WIRELESS CHARGING IN EYEWEAR WITH ENHANCED POSITIONAL FREEDOM," which is incorporated herein by reference in its entirety.

TECHNICAL FIELD

The present disclosure generally relates to systems and methods for wireless transfer of electrical power and/or electrical data signals, and, more particularly, to wireless charging in eyewear, having enhanced positional freedom.

BACKGROUND

Wireless charging and/or wireless connections are used in a variety of applications for the wireless transfer of electrical energy, electrical power, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmitting and receiving elements will often take the form of coiled wires and/or antennas. A variety of products having associated electronic elements, such as eyewear, may include wireless charging for reducing clutter, reducing reliance on physical connectors, improving user experience, improving product durability, among other reasons for including wireless power and/or charging.

Transmission of one or more of electrical energy, electrical power, electromagnetic energy and/or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics (e.g. electromagnetic interference (EMI) requirements, specific absorption rate (SAR) requirements, among other things), bill of materials (BOM), and/or form factor constraints, among other things. It is to be noted that, "self-resonating frequency," as known to those having skill in the art, generally refers to the resonant frequency of a passive component (e.g., an inductor) due to the parasitic characteristics of the component.

When such systems operate to wirelessly transfer power from a transmission system to a receiver system, via the coils and/or antennas, it is often desired to simultaneously or intermittently communicate electronic data from one system to the other. To that end, a variety of communications systems, methods, and/or apparatus have been utilized for combined wireless power and wireless data transfer. In some example systems, wireless power transfer related communications (e.g., validation procedures, electronic characteristics data communications, voltage data, current data, device type data, among other contemplated data communications) are performed using other circuitry, such as an optional Near Field Communications (NFC) antenna utilized to compliment the wireless power system and/or additional Bluetooth chipsets for data communications, among other known communications circuits and/or antennas.

However, using additional antennas and/or circuitry can give rise to several disadvantages. For instance, using additional antennas and/or circuitry can be inefficient and/or can increase the BOM of a wireless power system, which raises the cost for implementing wireless power into an electronic device. Further, in some such systems, out of band communications caused by such additional antennas may result in interference, such as out of band cross-talk between such antennas. Further yet, inclusion of such additional antennas and/or circuitry can result in worsened EMI, as introduction of the additional system will cause greater harmonic distortion, in comparison to a system wherein both a wireless power signal and a data signal are within the same channel. Still further, inclusion of additional antennas and/or circuitry hardware, for communications, may increase the area within a device, for which the wireless power systems and/or components thereof reside, complicating a build of an end product.

In some product applications, such as eyewear, positional location of wireless power antennas or coils may limit the positional freedom of the product, when charging. For example, in eyewear including wireless charging, a receiver antenna may be located in a temple of eyewear and the transmitter antenna, from which the receiver antenna receives power signals, is located in or on a case or receptacle for the eyewear. In such examples, temples of the eyewear are folded in towards a front face of the eyewear prior to storage in the case or receptacle. Thus, in such examples, a receiver antenna in the temple that is first folded towards the front face may be distanced further from the transmitter antenna, when placed in the receptacle, than it would be if it was folded second. Thus, wireless charging of the electronic components of the eyewear may be limited by positioning of the temples when placed into the charging receptacle, as order of folding will make the gap or Z-distance between the receiver antenna and the transmitter antenna variable.

SUMMARY

To that end, a wireless power system is desired that utilizes new antenna and/or magnetics placement within a structural body, to enhance the positional freedom for the end user device, when the device utilizes wireless power. Accordingly, the instant application provides for wireless power systems in eyewear, wherein a user can fold in either arm or temple first and the wireless power or charging experience will be unchanged. Thus, the configurations of the wireless power systems disclosed herein may enhance a separation gap or Z distance between receiver antennas and transmitter antennas of a wireless power system associated with eyewear and a receptacle therefor, thus allowing for the aforementioned enhancements to positional freedom and/or user experience.

Further, the systems and apparatus disclosed herein may result in wireless power integration in eyewear and an associated charging receptacle, without introducing unnecessary bulk and/or weight in the eyewear. Inclusion of the antennas disclosed herein may result in the eyewear having its mass or weight minimized, by limiting layers and/or turns of the antennas and, thus, the amount of metal needed for the antennas, while still maintaining the large separation gaps necessary for positional freedom.

Such a reduction in weight, while maintaining the separation distance, may be achieved by utilizing the repeater antennas disclosed herein. The repeater antennas are utilized in an opposing arm or temple of the eyewear to repeat the wireless power signal to a receiver antenna that is at a distance further from the transmitter antenna, as compared to the distance between the transmitter antenna and the repeater antenna. Inexpensive, light weight antennas may be used to realize the repeater antenna, such as, but not limited to, a wire wound antenna, a printed circuit board (PCB) antenna, a flexible printed circuit board (FPCB) antenna, a "sticker-type" antenna, or combinations thereof; thus, weight or user experience is not adversely impacted by inclusion of the repeater antenna.

While it would be possible to not include the repeater antenna and still achieve the necessary separation distance for achieving positional freedom, the receiver antennas necessary to enable such separation distances would require one or more of excess of turns, excess of layers, additional or greater magnetics shielding materials (e.g., a ferrite, a polymer, among other shielding materials), and combinations thereof. Such bulkier antennas are unnecessary in the systems and apparatus disclosed herein, as the inclusion of the repeater antenna will obviate the need for such bulkier, more metal intensive and/or shielding material intensive antennas, while achieving desired positional flexibility. Further, such use of the receiver/repeater antenna combination may result in lower bill of materials (BOM) cost for the wireless power system of the end user device.

Additionally, inclusion of the repeater antenna may provide for improved thermal performance, during wireless power transfer over a wireless power transfer system. The repeater antenna may reduce output power drive requirements of the power conditioning system, as including the repeater antenna may increase an effective mutual inductance of the wireless power transfer system; due to the increase in mutual inductance, the output current of the wireless transmission system(s) can be lowered, compared to wireless power transmission systems that do not include a repeater antenna in the signal path of the wireless power signals transferred therein. Thus, the inclusion of the repeater antenna may further reduce thermal constraints and/or prevent unnecessary heating in the system, while maintaining the increased separation distances discussed above.

Such wireless power systems may include new, high frequency wireless power systems, which utilize new circuits for allowing higher power transfer (greater than 300 mW), without damaging circuitry and/or without degrading communications below a desired standard data protocol, are desired.

Wireless transmission systems disclosed herein may include a damping circuit, which is configured for damping an AC wireless signal during transmission of the AC wireless signal and associated data signals. The damping circuit may be configured to reduce rise and fall times during amplitude shift keying signal transmission, such as, but not limited to on-off keying (OOK) signal transmission, voltage amplitude shifting signal transmission, among other ASK based signal transmission. Such damping during ASK signal transmission is configured such that the rate of the data signals may not only be compliant and/or legible but may also achieve faster data rates and/or enhanced data ranges, when compared to legacy systems.

Damping circuits of the present disclosure may include one or more of a damping diode, a damping capacitor, a damping resistor, or any combinations thereof for further enhancing signal characteristics and/or signal quality.

In some embodiments wherein the damping circuit includes the damping resistor, the damping resistor is in electrical series with the damping transistor 63 and has a resistance value (ohms) configured such that it dissipates at least some power from the power signal. Such dissipation may serve to accelerate rise and fall times in an amplitude shift keying signal, an OOK signal, and/or combinations thereof.

In some such embodiments, the value of the damping resistor is selected, configured, and/or designed such that the damping resistor dissipates the minimum amount of power to achieve the fastest rise and/or fall times in an in-band signal allowable and/or satisfy standards limitations for minimum rise and/or fall times; thereby achieving data fidelity at maximum efficiency (less power lost to resistance) as well as maintaining data fidelity when the system is unloaded and/or under lightest load conditions.

In some embodiments wherein the damping circuit includes the damping capacitor, the damping capacitor may be configured to smooth out transition points in an in-band signal and limit overshoot and/or undershoot conditions in such a signal.

In some embodiments wherein the damping circuit includes the damping diode, the diode is positioned such that a current cannot flow out of the damping circuit, when a damping transistor is in an off state. Thus, the diode may prevent power efficiency loss in an AC power signal when the damping circuit is not active.

For example, in legacy NFC-DC systems, the poller (receiver system) often utilizes a microprocessor from the NTAG family of microprocessors, which was initially designed for very low power data communications. NTAG microprocessors, without protection or isolation, may not adequately and/or efficiently receive wireless power signals at output levels over 1 W. However, inventors of the present application have found, in experimental results, that when utilizing voltage isolation circuits as disclosed herein, the NTAG chip may be utilized and/or retrofitted for wireless power transfer and wireless communications, either independently or simultaneously.

In accordance with one aspect of the disclosure, eyewear is disclosed. The eyewear includes a front face, a first arm in mechanical connection with the front face, a second arm in mechanical connection with the front face, one or more electrical components, and a first wireless receiver system. The first wireless receiver system is configured to receive first wireless power signals from a first wireless transmission system. The first wireless receiver system includes a first repeater antenna, a first receiver antenna, and a first power conditioning system. The first repeater antenna is configured to receive the first wireless power signals from the wireless transmission system and transmit first repeated wireless power signals, the first repeated wireless power signals based on the first wireless power signals, the first repeater antenna operatively associated with the second arm. The first receiver antenna is configured to receive one or both of the first wireless power signals and the first repeated wireless power signals, the first receiver antenna operatively associated with the first arm. The first power conditioning system is configured to receive one or both of the first wireless power signals and the first repeated wireless power signals and convert one or both of the first electrical power signals and the first repeated wireless power signals to first electrical power for provision to the one or more electronic components.

In a refinement, the first arm extends from a first proximal end to a first distal end, the first proximal end proximal to the front face and the second arm extends from a second proximal end to a second distal end, the second proximal end proximal to the front face. The first arm includes a first forward portion distal from the first proximal end and a first distal portion distal from the first forward portion. The first receiver antenna is positioned proximal to the first forward portion and the first repeater antenna is proximal to the second distal portion.

In a refinement, a second wireless receiver system is configured to receive second wireless power signals from the first wireless transmission system, the second wireless receiver system including a second repeater antenna configured to receive the second wireless power signals from the wireless transmission system and transmit second repeated wireless power signals, the second repeated wireless power signals based on the second wireless power signals, the second repeater antenna operatively associated with the first arm. The second wireless receiver system further includes a second receiver antenna configured to receive one or both of the second wireless power signals and the second repeated wireless power signals, the second receiver antenna operatively associated with the second arm. The second wireless receiver system further includes a second power conditioning system configured to receive one or both of the second wireless power signals and the second repeated wireless power signals and convert one or both of the second electrical power signals and the second repeated wireless power signals to second electrical power for provision to the one or more electronic components.

In a refinement, a second wireless receiver system is configured to receive second wireless power signals from a second wireless transmission system, the second wireless receiver system including a second repeater antenna configured to receive the second wireless power signals from the second wireless transmission system and transmit second repeated wireless power signals, the second repeated wireless power signals based on the second wireless power signals, the second repeater antenna operatively associated with the first arm. The second wireless receiver system further includes a second receiver antenna configured to receive one or both of the second wireless power signals and the second repeated wireless power signals, the second receiver antenna operatively associated with the second arm. The second wireless receiver system further includes a second power conditioning system configured to receive one or both of the second wireless power signals and the second repeated wireless power signals and convert one or both of the second electrical power signals and the second repeated wireless power signals to second electrical power for provision to the one or more electronic components.

In a further refinement, the first arm extends from a first proximal end to a first distal end, the first proximal end proximal to the front face and the second arm extends from a second proximal end to a second distal end, the second proximal end proximal to the front face. The first arm includes a first forward portion distal from the first proximal end and a first distal portion distal from the first forward portion and the second arm includes a second forward portion distal from the second proximal end and a second distal portion distal from the second forward portion. The first receiver antenna is positioned proximal to the first forward portion and the first repeater antenna is positioned proximal to the second distal portion. The second receiver antenna is positioned proximal to the second forward portion and the second repeater antenna is positioned proximal to the first distal portion.

In a further refinement, the first and second arms are each mechanically moveable with respect to the front face and configured to fold inward towards the front face. If the first arm is folded inward, such that it is positioned between the front face and the second arm, then the first receiver antenna receives the first repeated wireless power signals.

In another further refinement, the first and second arms are each mechanically movable with respect to the front face and configured to fold inward towards the front face. If the second arm is first folded inward such that it is positioned between the front face and the first arm, then the second receiver antenna receives the second repeated wireless power signals.

In a refinement, the wireless transmission system includes a first transmission antenna, the second wireless transmission system includes a second transmission antenna, the first transmission antenna is configured to couple with the first repeater antenna and the first receiver antenna, and the second transmission antenna is configured to couple with the second repeater antenna and the second receiver antenna.

In a refinement, the one or more electrical components includes one or more of a display device, an audio device, a battery, a processor, or combinations thereof.

In a refinement, the first arm is a first temple for the eyewear and the second arm is a second temple for the eyewear.

In accordance with another aspect of the disclosure, a wireless power transfer system is disclosed. The wireless power transfer system is operatively associated with eyewear and a receptacle. The receptacle is configured for mechanical interaction with the eyewear, the eyewear including a front face, a first arm, and a second arm. The system includes a wireless transmission system operatively associated with the receptacle, the wireless transmission system configured to transmit first wireless power signals, the wireless transmission system including at least one transmission antenna. The system further includes a first wireless receiver system configured to receive first wireless power signals from the wireless transmission system. The first wireless receiver system includes a first repeater antenna, a first receiver antenna, and a first power conditioning system. The first repeater antenna is configured to receive the first wireless power signals from the wireless transmission system and transmit first repeated wireless power signals, the first repeated wireless power signals based on the first wireless power signals, the first repeater antenna operatively associated with the second arm. The first receiver antenna is configured to receive one or both of the first wireless power signals and the first repeated wireless power signals, the first receiver antenna operatively associated with the first arm. The first power conditioning system is configured to receive one or both of the first wireless power signals and the first repeated wireless power signals and convert one or both of the first electrical power signals and the first repeated wireless power signals to first electrical power for provision to the one or more electronic components.

In a refinement, the receptacle includes one or more mechanical features, the one or more mechanical features figured for mechanically receiving the eyewear. The wireless transmission system is configured to transmit the first wireless power signal to the first wireless receiver system when the eyewear is mechanically received by the one or more mechanical features.

In a refinement, a second wireless receiver system is configured to receive second wireless power signals from a second wireless transmission system, the second wireless receiver system including a second repeater antenna configured to receive the second wireless power signals from the second wireless transmission system and transmit second repeated wireless power signals, the second repeated wireless power signals based on the second wireless power signals, the second repeater antenna operatively associated with the first arm. The second wireless receiver system further includes a second receiver antenna configured to receive one or both of the second wireless power signals and the second repeated wireless power signals, the second receiver antenna operatively associated with the second arm. The second wireless receiver system further includes a second power conditioning system configured to receive one or both of the second wireless power signals and the second repeated wireless power signals and convert one or both of the second electrical power signals and the second repeated wireless power signals to second electrical power for provision to the one or more electronic components.

In a further refinement, the first arm extends from a first proximal end to a first distal end, the first proximal end proximal to the front face and the second arm extends from a second proximal end to a second distal end, the second proximal end proximal to the front face. The first arm includes a first forward portion distal from the first proximal end and a first distal portion distal from the first forward portion and the second arm includes a second forward portion distal from the second proximal end and a second distal portion distal from the second forward portion. The first receiver antenna is positioned proximal to the first forward portion and the first repeater antenna is positioned proximal to the second distal portion. The second receiver antenna is positioned proximal to the second forward portion and the second repeater antenna is positioned proximal to the first distal portion.

In a refinement, one or more of the first transmitter antenna, the first repeater antenna, and the first receiver antenna are configured to operate at an operating frequency in a range of about 13.553 MHz to about 13.567 MHz.

In a refinement, one or more of the first transmitter antenna, the first repeater antenna, and the first receiver antenna are configured to operate at an operating frequency in a range of about 6.78 MHz.

In accordance with another aspect of the disclosure, a wireless receiver system, associated with eyewear, is disclosed. The eyewear includes a front face, a first arm, and a second arm. The wireless receiver system includes a first repeater antenna configured to receive the first wireless power signals from the wireless transmission system and transmit first repeated wireless power signals, the first repeated wireless power signals based on the first wireless power signals, the first repeater antenna operatively associated with the second arm. The wireless receiver system includes a first receiver antenna configured to receive one or both of the first wireless power signals and the first repeated wireless power signals, the first receiver antenna operatively associated with the first arm. The wireless receiver system further includes a first power conditioning system configured to receive one or both of the first wireless power signals and the first repeated wireless power signals and convert one or both of the first electrical power signals and the first repeated wireless power signals to first electrical power for provision to the one or more electronic components.

In a refinement, the wireless receiver system includes a second repeater antenna configured to receive the second wireless power signals from the wireless transmission system and transmit second repeated wireless power signal, the second repeated wireless power signals based on the second wireless power signals, the second repeater antenna operatively associated with the first arm. The wireless receiver system further includes a second receiver antenna configured to receive one or both of the second wireless power signals and the second repeated wireless power signals, the second receiver antenna operatively associated with the second arm. The wireless receiver system further includes a second power conditioning system configured to receive one or both of the second wireless power signals and the second repeated wireless power signals and convert one or both of the second electrical power signals and the second repeated wireless power signals to second electrical power for provision to the one or more electronic components.

In a refinement, the first arm extends from a first proximal end to a first distal end, the first proximal end proximal to the front face, and the second arm extends from a second proximal end to a second distal end, the second proximal end proximal to the front face. The first arm includes a first forward portion distal from the first proximal end and a first distal portion distal from the first forward portion. The second arm includes a second forward portion distal from the second proximal end and a second distal portion distal from the second forward portion and the first receiver antenna is positioned proximal to the first forward portion and the first repeater antenna is positioned proximal to the second distal portion.

In a further refinement, the first and second arms are each mechanically movable with respect to the front face and configured to fold inward towards the front face. If the first arm is folded inward such that it is positioned between the front face and the second arm, then the first receiver antenna receives the first repeated wireless power signals. If the second arm is first folded inward such that it is positioned between the front face and the first arm, then the second receiver antenna receives the second repeated wireless power signals.

These and other aspects and features of the present disclosure will be better understood when read in conjunction with the accompanying drawings.

BRIEF DESCRIPTION OF THE DRAWINGS

FIG. 17 is an exemplary method for designing a system for wireless transmission of one or more of electrical energy, electrical power signals, electrical power, electrical electromagnetic energy, electronic data, and combinations thereof, in accordance with FIGS. FIGS. 1-7, 9-16, and the present disclosure.

FIG. 18 is a flow chart for an exemplary method for designing a wireless transmission system for the system of FIG. 17, in accordance with FIGS. 1-7, 9-17, and the present disclosure.

FIG. 19 is a flow chart for an exemplary method for designing a wireless receiver system for the system of FIG. 17, in accordance with FIGS. 1-7, 9-17 and the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
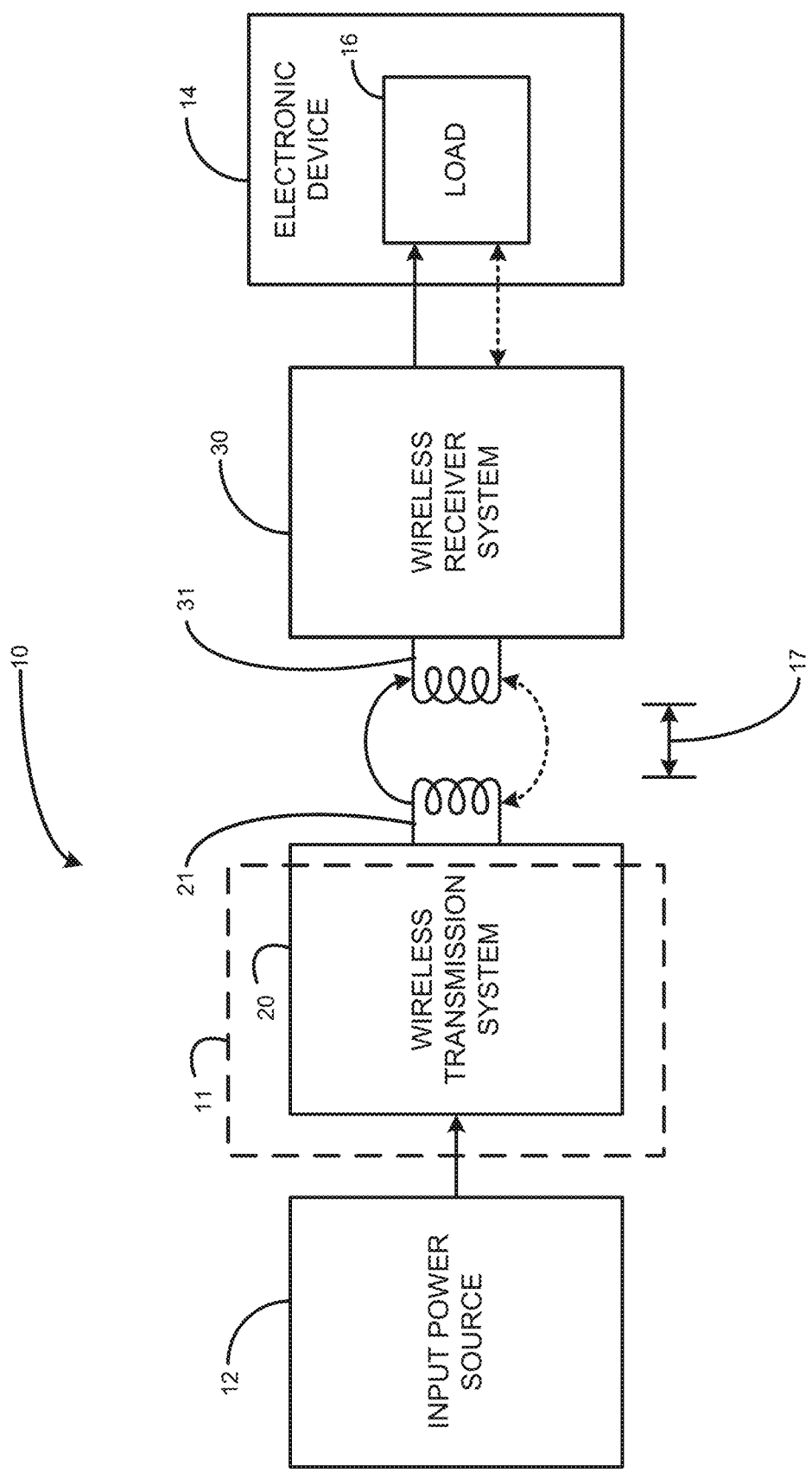
FIG. 1 is a block diagram of an embodiment of a system for wirelessly transferring one or more of electrical energy, electrical power signals, electrical power, electromagnetic energy, electronic data, and combinations thereof, in accordance with the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for the wireless transmission of electrical signals via near field magnetic coupling. As shown in the embodiment of FIG. 1, the wireless power transfer system 10 includes a wireless transmission system 20 and a wireless receiver system 30. The wireless receiver system is configured to receive electrical signals from, at least, the wireless transmission system 20. In some examples, such as examples wherein the wireless power transfer system is configured for wireless power transfer via the Near Field Communications Direct Charge (NFC-DC) or Near Field Communications Wireless Charging (NFC WC) draft or accepted standard, the wireless transmission system 20 may be referenced as a "listener" of the NFC-DC wireless transfer system 20 and the wireless receiver system 30 may be referenced as a "poller" of the NFC-DC wireless transfer system.

As illustrated, the wireless transmission system 20 and wireless receiver system 30 may be configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of the wireless transmission system 20 and the wireless receiver system 30 create an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

In some cases, the gap 17 may also be referenced as a "Z-Distance," because, if one considers an antenna 21, 31 each to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, the wireless transmission system 20 may be associated with a host device 11, which may receive power from an input power source 12. The host device 11 may be any electrically operated device, circuit board, electronic assembly, dedicated charging device, or any other contemplated electronic device. Example host devices 11, with which the wireless transmission system 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 20 and the host device 11 are operatively associated with an input power source 12. The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system 20 is then used for at least two purposes: to provide electrical power to internal components of the wireless transmission system 20 and to provide electrical power to the transmitter antenna 21. The transmitter antenna 21 is configured to wirelessly transmit the electrical signals conditioned and modified for wireless transmission by the wireless transmission system 20 via near-field magnetic coupling (NFMC). Near-field magnetic coupling enables the transfer of signals wirelessly through magnetic induction between the transmitter antenna 21 and a receiving antenna 31 of, or associated with, the wireless receiver system 30. Near-field magnetic coupling may be and/or be referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmitter antenna 21 or the receiver antenna 31 are strategically positioned to facilitate reception and/or transmission of wirelessly transferred electrical signals through near field magnetic induction. Antenna operating frequencies may comprise relatively high operating frequency ranges, examples of which may include, but are not limited to, 6.78 MHz (e.g., in accordance with the Rezence and/or Airfuel interface standard and/or any other proprietary interface standard operating at a frequency of 6.78 MHz), 13.56 MHz (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer. In systems wherein the wireless power transfer system 10 is operating within the NFC-DC standards and/or draft standards, the operating frequency may be in a range of about 13.553 MHz to about 13.567 MHz.

The transmitting antenna and the receiving antenna of the present disclosure may be configured to transmit and/or receive electrical power having a magnitude that ranges from about 10 milliwatts (mW) to about 500 watts (W). In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30 may be associated with at least one electronic device 14, wherein the electronic device 14 may be any device that requires electrical power for any function and/or for power storage (e.g., via a battery and/or capacitor). Additionally, the electronic device 14 may be any device capable of receipt of electronically transmissible data. For example, the device may be, but is not limited to being, eyewear (electronically modified glasses, sunglasses, prescription glasses, glasses having a heads-up display (HUD) displayed thereon, altered-reality (AR) glasses, virtual reality (VR) glasses, among other eyewear) a handheld computing device, a mobile device, a portable appliance, an integrated circuit, an identifiable tag, a kitchen utility device, an electronic tool, an electric vehicle, a game console, a robotic device, a wearable electronic device (e.g., an electronic watch, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless power transfer, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmitter antenna, to a receiver antenna, where, on the receiver end, the data signal is decoded by a respective communications device of the receiver.

Figure 2:
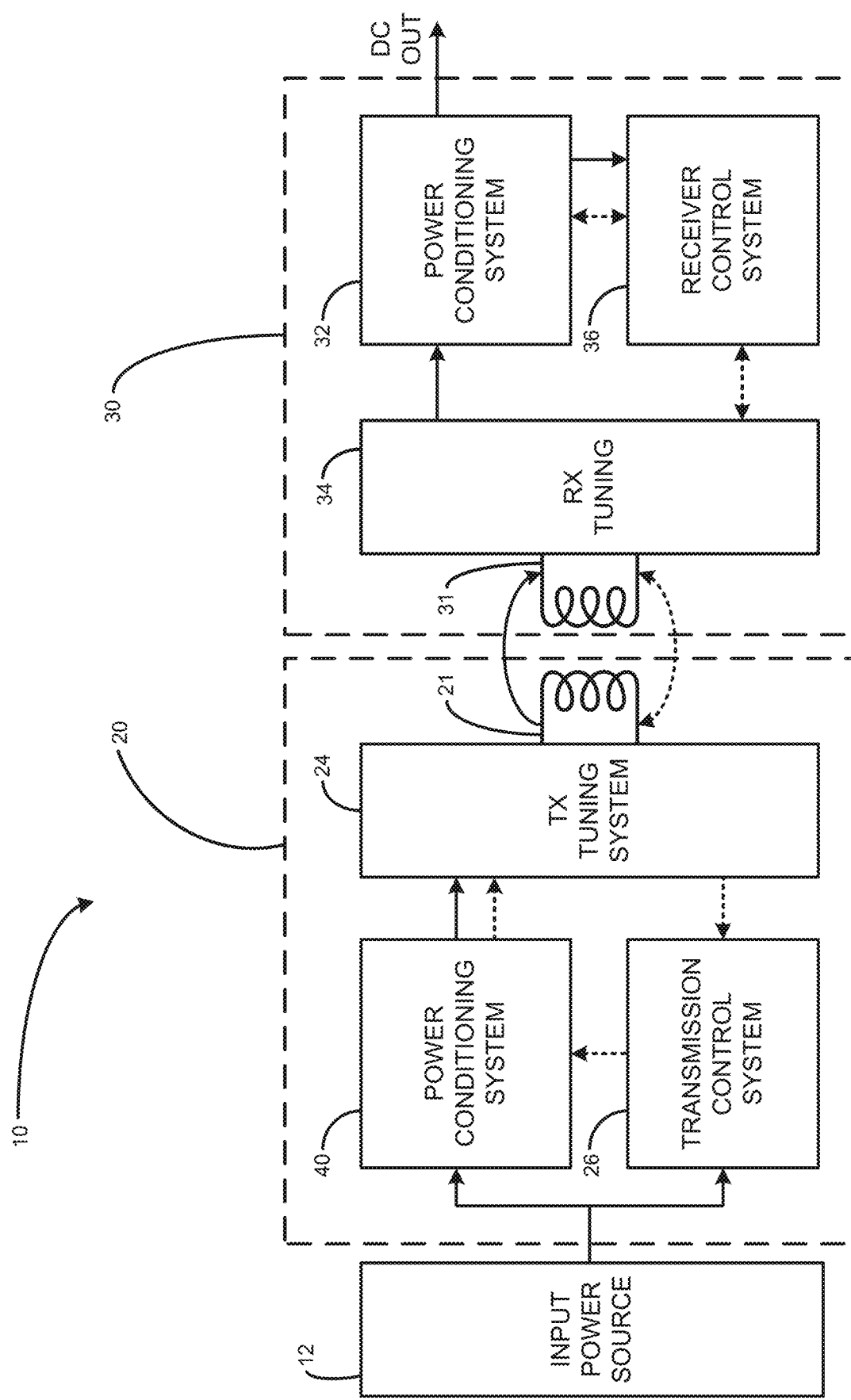
FIG. 2 is a block diagram illustrating components of a wireless transmission system of the system of FIG. 1 and a wireless receiver system of the system of FIG. 1, in accordance with FIG. 1 and the present disclosure.

Turning now to FIG. 2, the wireless connection system 10 is illustrated as a block diagram including example subsystems of both the wireless transmission system 20 and the wireless receiver system 30. The wireless transmission system 20 may include, at least, a power conditioning system 40, a transmission control system 26, a transmission tuning system 24, and the transmitter antenna 21. A first portion of the electrical energy input from the input power source 12 is configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmitter antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

Figure 3:
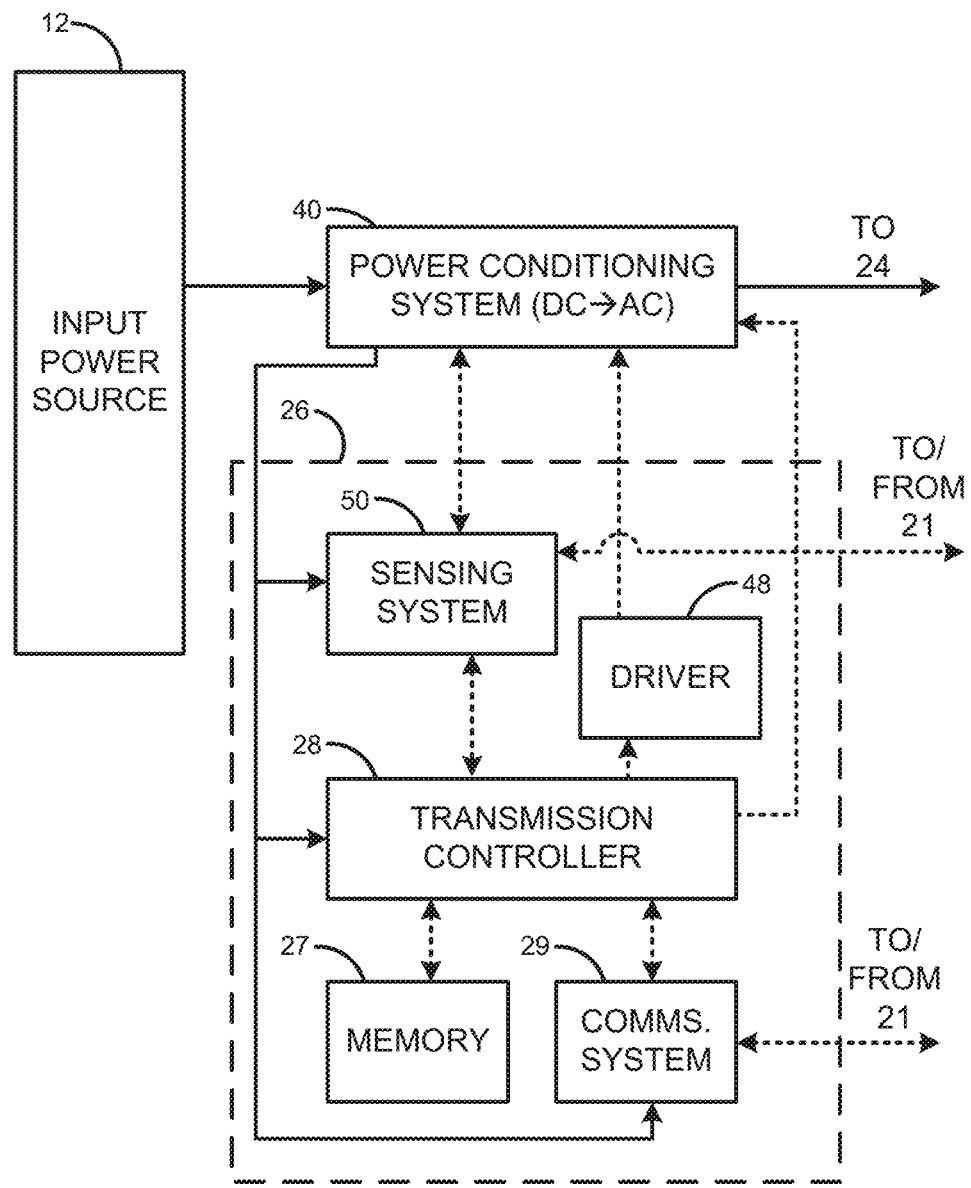
FIG. 3 is a block diagram illustrating components of a transmission control system of the wireless transmission system of FIG. 2, in accordance with FIG. 1, FIG. 2, and the present disclosure.

Referring now to FIG. 3, with continued reference to FIGS. 1 and 2, subcomponents and/or systems of the transmission control system 26 are illustrated. The transmission control system 26 may include a sensing system 50, a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. In some examples, PWM signal may be configured to generate a duty cycle for the AC power signal output by the power conditioning system 40. In some such examples, the duty cycle may be configured to be about 50% of a given period of the AC power signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmitter antenna 21, the receiver antenna 31, along with any other components and/or subcomponents thereof.

Figure 4:
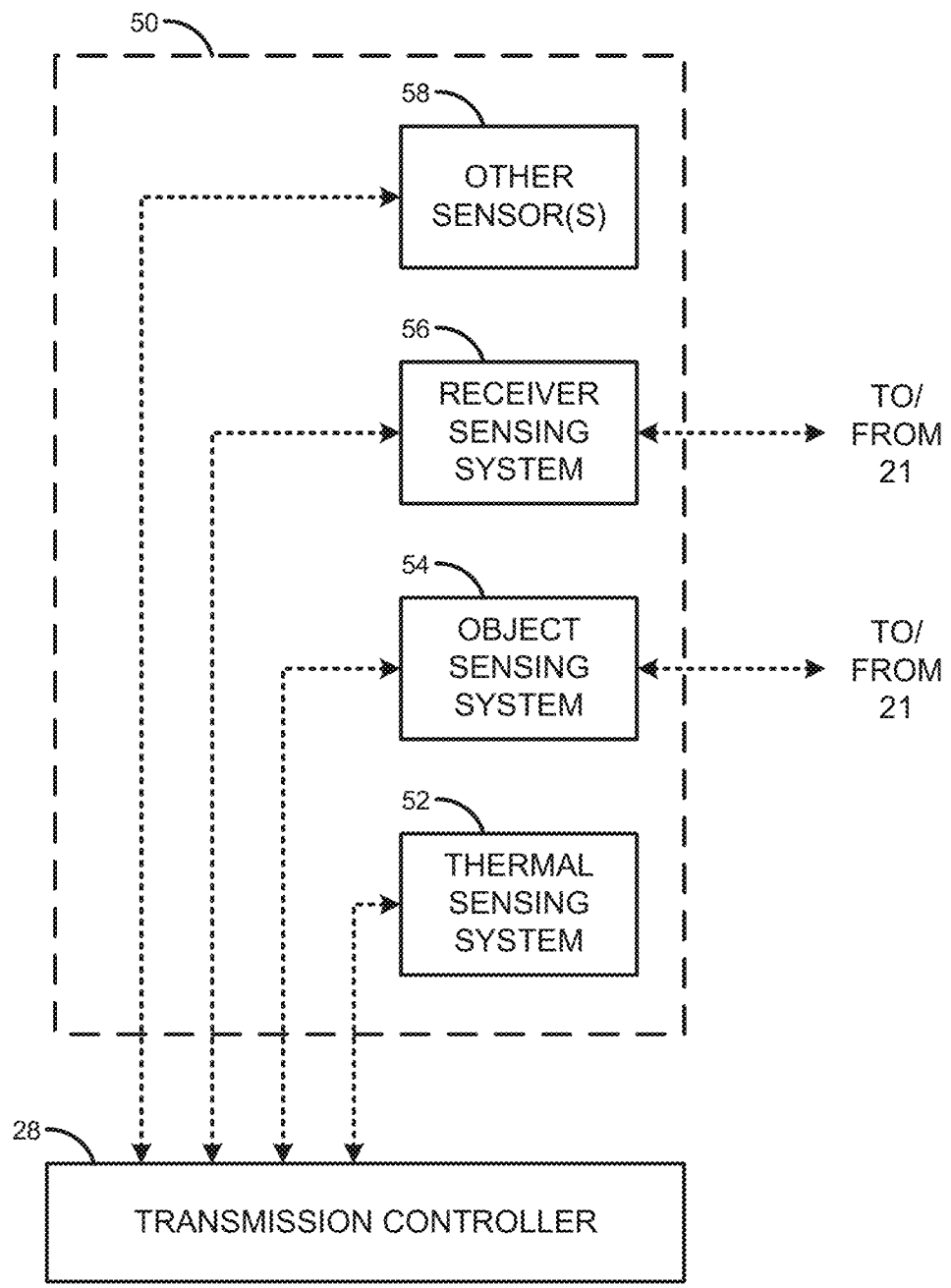
FIG. 4 is a block diagram illustrating components of a sensing system of the transmission control system of FIG. 3, in accordance with FIGS. 1-3 and the present disclosure.

As illustrated in the embodiment of FIG. 4, the sensing system 50 may include, but is not limited to including, a thermal sensing system 52, an object sensing system 54, a receiver sensing system 56, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 20° Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect one or more of the wireless receiver system 30 and/or the receiver antenna 31, thus indicating to the transmission controller 28 that the receiver system 30 is proximate to the wireless transmission system 20. Additionally or alternatively, the object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmitter antenna 20 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the wireless transmission system 20. In some examples, the receiver sensing system 56 and the object sensing system 54 may be combined, may share components, and/or may be embodied by one or more common components. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 5:
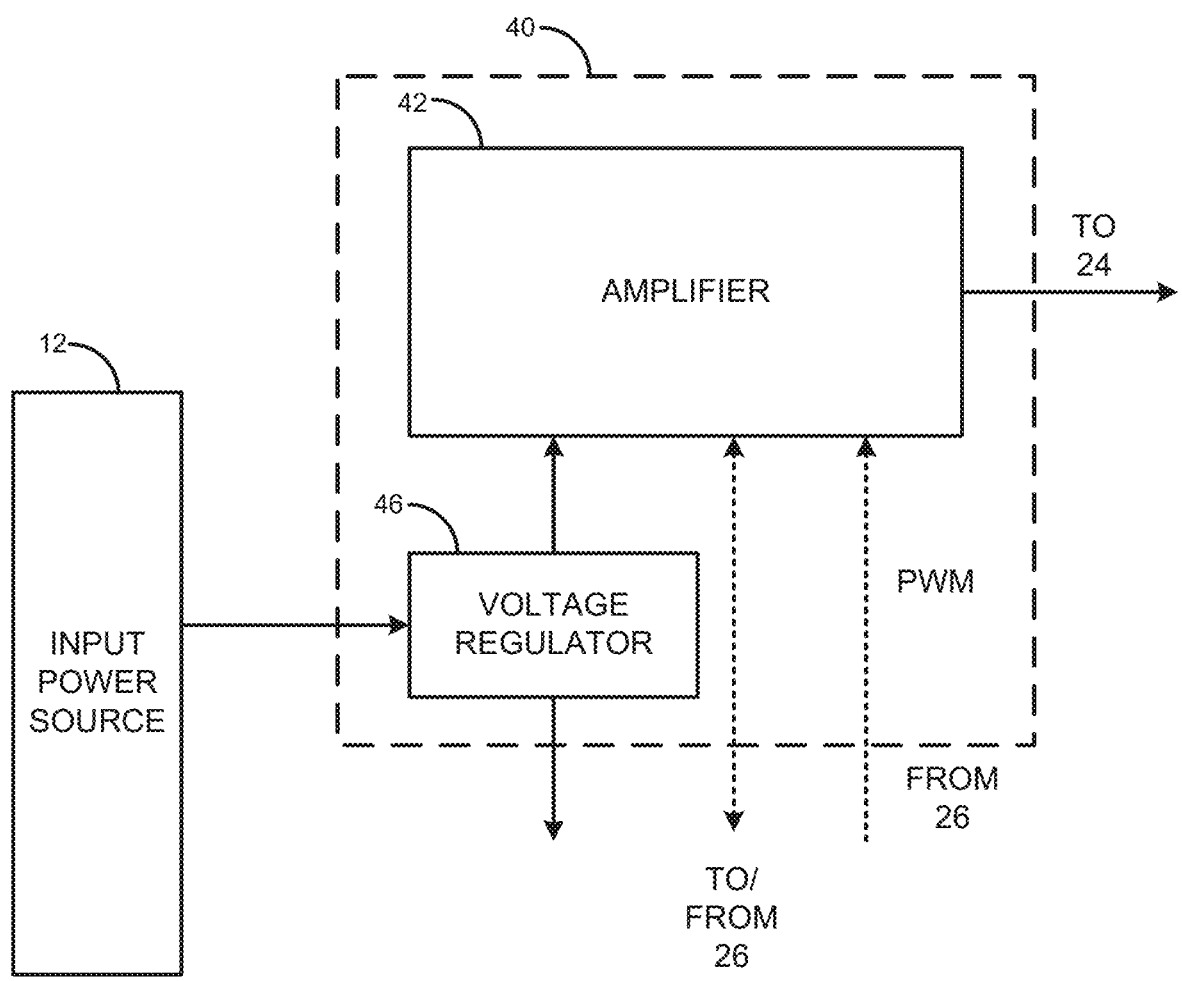
FIG. 5 is a block diagram illustrating components of a power conditioning system of the wireless transmission system of FIG. 2, in accordance with FIG. 1, FIG. 2, and the present disclosure.

Referring now to FIG. 5, and with continued reference to FIGS. 1-4, a block diagram illustrating an embodiment of the power conditioning system 40 is illustrated. At the power conditioning system 40, electrical power is received, generally, as a DC power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 21. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an AC as output, based, at least in part, on PWM input from the transmission control system 26. The amplifier 42 may be or include, for example, a power stage invertor, such as a dual field effect transistor power stage invertor or a quadruple field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W. In some examples, the amplifier 42 may be or may include one or more class-E power amplifiers. Class-E power amplifiers are efficiently tuned switching power amplifiers designed for use at high frequencies (e.g., frequencies from about 1 MHz to about 1 GHz). Generally, a class-E amplifier employs a single-pole switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, and/or a push-pull invertor, among other amplifiers that could be included as part of the amplifier 42.

Figure 6:
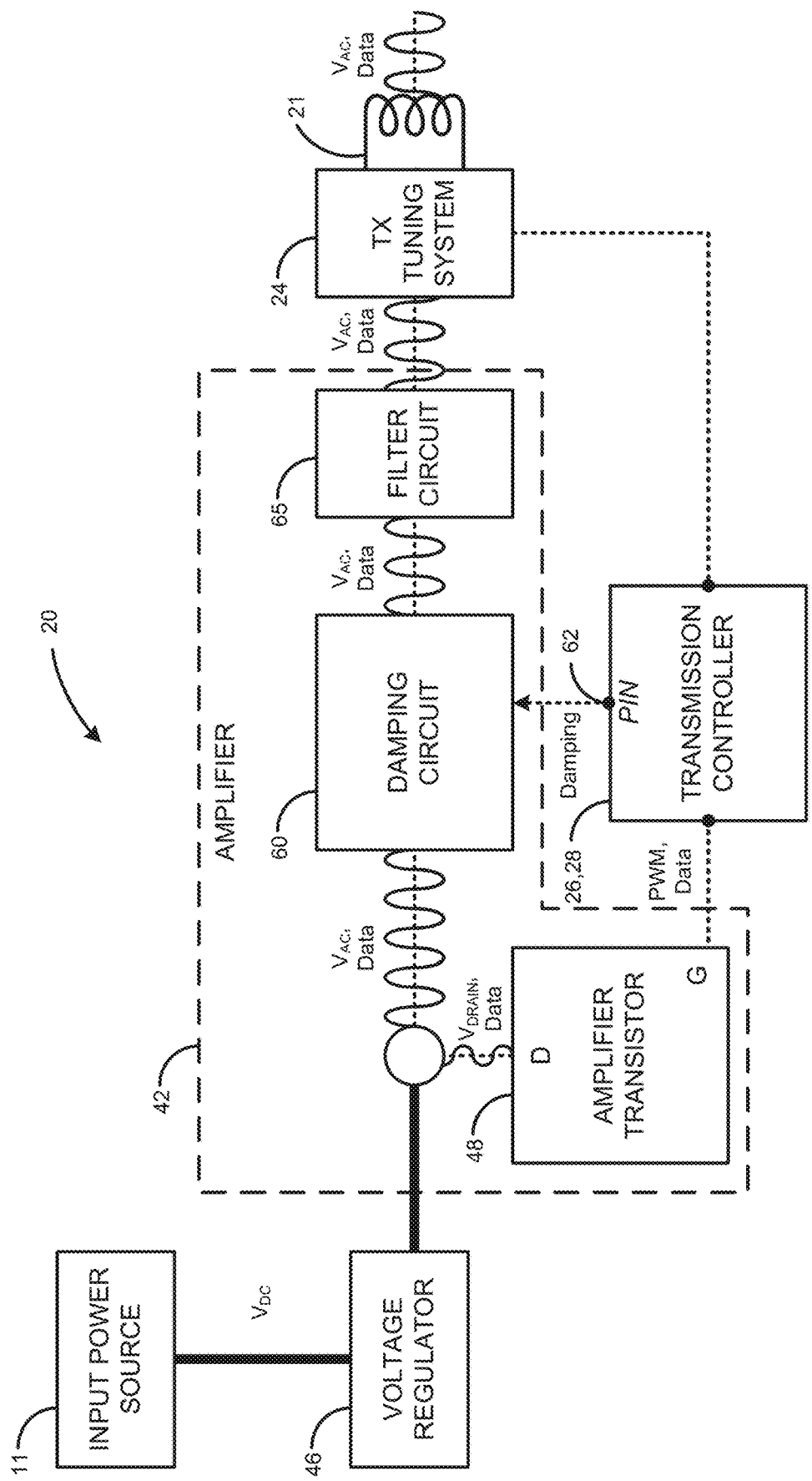
FIG. 6 is a block diagram of elements of the wireless transmission system of FIGS. 1-5, further illustrating components of an amplifier of the power conditioning system of FIG. 5 and signal characteristics for wireless power transmission, in accordance with FIGS. 1-5 and the present disclosure.
Figure 7:
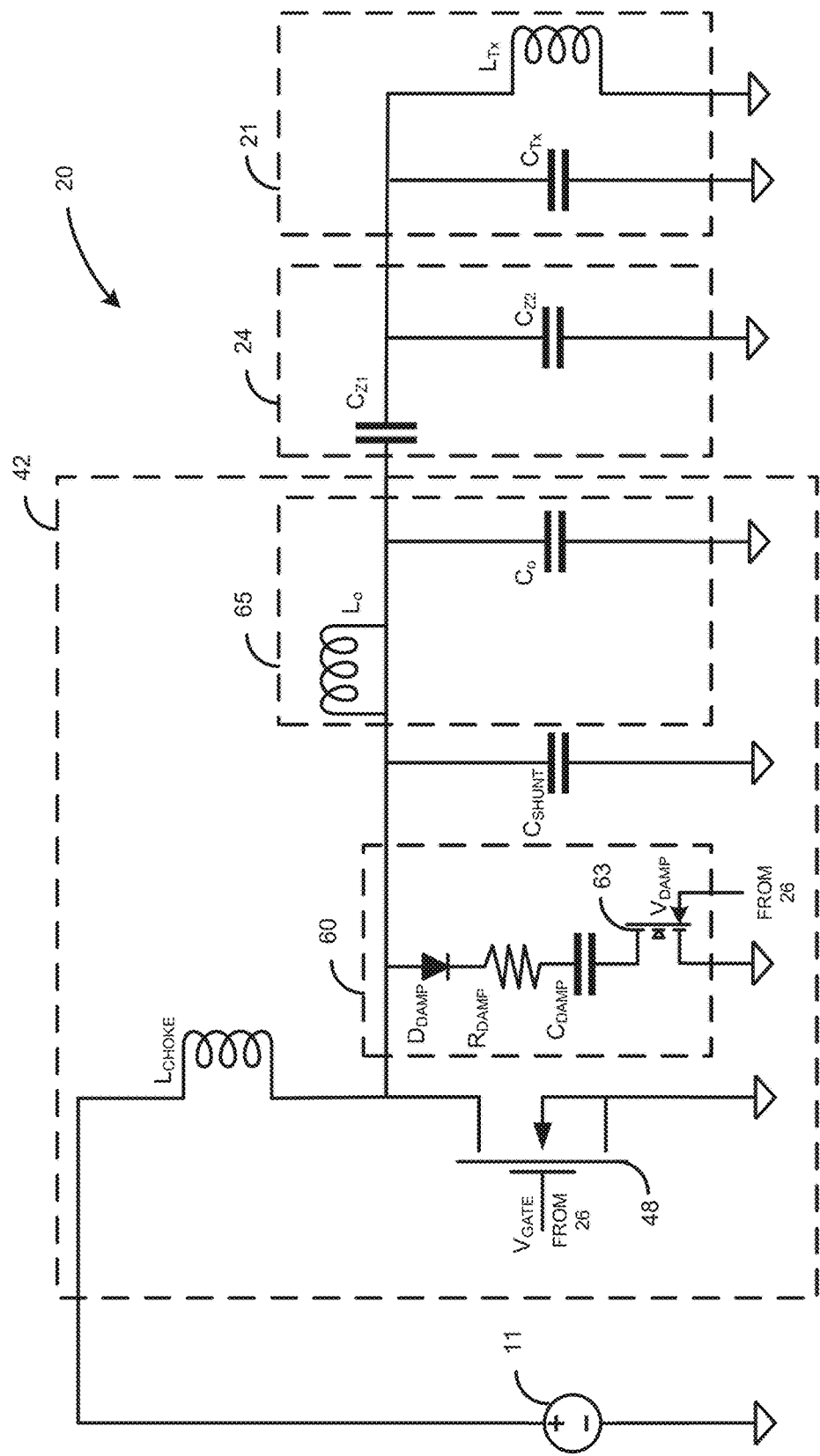
FIG. 7 is an electrical schematic diagram of elements of the wireless transmission system of FIGS. 1-6, further illustrating components of an amplifier of the power conditioning system of FIGS. 5-6, in accordance with FIGS. 1-6 and the present disclosure.

Turning now to FIGS. 6 and 7, the wireless transmission system 20 is illustrated, further detailing elements of the power conditioning system 40, the amplifier 42, the tuning system 24, among other things. The block diagram of the wireless transmission system 20 illustrates one or more electrical signals and the conditioning of such signals, altering of such signals, transforming of such signals, inverting of such signals, amplification of such signals, and combinations thereof. In FIG. 6, DC power signals are illustrated with heavily bolded lines, such that the lines are significantly thicker than other solid lines in FIG. 6 and other figures of the instant application, AC signals are illustrated as substantially sinusoidal wave forms with a thickness significantly less bolded than that of the DC power signal bolding, and data signals are represented as dotted lines. It is to be noted that the AC signals are not necessarily substantially sinusoidal waves and may be any AC waveform suitable for the purposes described below (e.g., a half sine wave, a square wave, a half square wave, among other waveforms). FIG. 7 illustrates sample electrical components for elements of the wireless transmission system, and sub-components thereof, in a simplified form. Note that FIG. 7 may represent one branch or sub-section of a schematic for the wireless transmission system 20 and/or components of the wireless transmission system 20 may be omitted from the schematic illustrated in FIG. 7 for clarity.

As illustrated in FIG. 6 and discussed above, the input power source 11 provides an input direct current voltage ($V_{DC}$), which may have its voltage level altered by the voltage regulator 46, prior to conditioning at the amplifier 42. In some examples, as illustrated in FIG. 7, the amplifier 42 may include a choke inductor $L_{CHOKE}$, which may be utilized to block radio frequency interference in $V_{DC}$, while allowing the DC power signal of $V_{DC}$ to continue towards an amplifier transistor 48 of the amplifier 42. $V_{CHOKE}$ may be configured as any suitable choke inductor known in the art.

The amplifier 48 is configured to alter and/or invert $V_{DC}$ to generate an AC wireless signal $V_{AC}$, which, as discussed in more detail below, may be configured to carry one or both of an inbound and outbound data signal (denoted as "Data" in FIG. 6). The amplifier transistor 48 may be any switching transistor known in the art that is capable of inverting, converting, and/or conditioning a DC power signal into an AC power signal, such as, but not limited to, a field-effect transistor (FET), gallium nitride (GaN) FETS, bipolar junction transistor (BJT), and/or wide-bandgap (WBG) semiconductor transistor, among other known switching transistors. The amplifier transistor 48 is configured to receive a driving signal (denoted as "PWM" in FIG. 6) from at a gate of the amplifier transistor 48 (denoted as "G" in FIG. 6) and invert the DC signal $V_{DC}$ to generate the AC wireless signal at an operating frequency and/or an operating frequency band for the wireless power transmission system 20. The driving signal may be a PWM signal configured for such inversion at the operating frequency and/or operating frequency band for the wireless power transmission system 20.

The driving signal is generated and output by the transmission control system 26 and/or the transmission controller 28 therein, as discussed and disclosed above. The transmission controller 26, 28 is configured to provide the driving signal and configured to perform one or more of encoding wireless data signals (denoted as "Data" in FIG. 6), decoding the wireless data signals (denoted as "Data" in FIG. 6) and any combinations thereof. In some examples, the electrical data signals may be in band signals of the AC wireless power signal. In some such examples, such in-band signals may be on-off-keying (OOK) signals in-band of the AC wireless power signals. For example, Type-A communications, as described in the NFC Standards, are a form of OOK, wherein the data signal is on-off-keyed in a carrier AC wireless power signal operating at an operating frequency in a range of about 13.553 MHz to about 13.567 MHz.

However, when the power, current, impedance, phase, and/or voltage levels of an AC power signal are changed beyond the levels used in current and/or legacy hardware for high frequency wireless power transfer (over about 500 mW transmitted), such legacy hardware may not be able to properly encode and/or decode in-band data signals with the required fidelity for communications functions. Such higher power in an AC output power signal may cause signal degradation due to increasing rise times for an OOK rise, increasing fall time for an OOK fall, overshooting the required voltage in an OOK rise, and/or undershooting the voltage in an OOK fall, among other potential degradations to the signal due to legacy hardware being ill equipped for higher power, high frequency wireless power transfer. Thus, there is a need for the amplifier 42 to be designed in a way that limits and/or substantially removes rise and fall times, overshoots, undershoots, and/or other signal deficiencies from an in-band data signal during wireless power transfer. This ability to limit and/or substantially remove such deficiencies allows for the systems of the instant application to provide higher power wireless power transfer in high frequency wireless power transmission systems.

Figure 8:
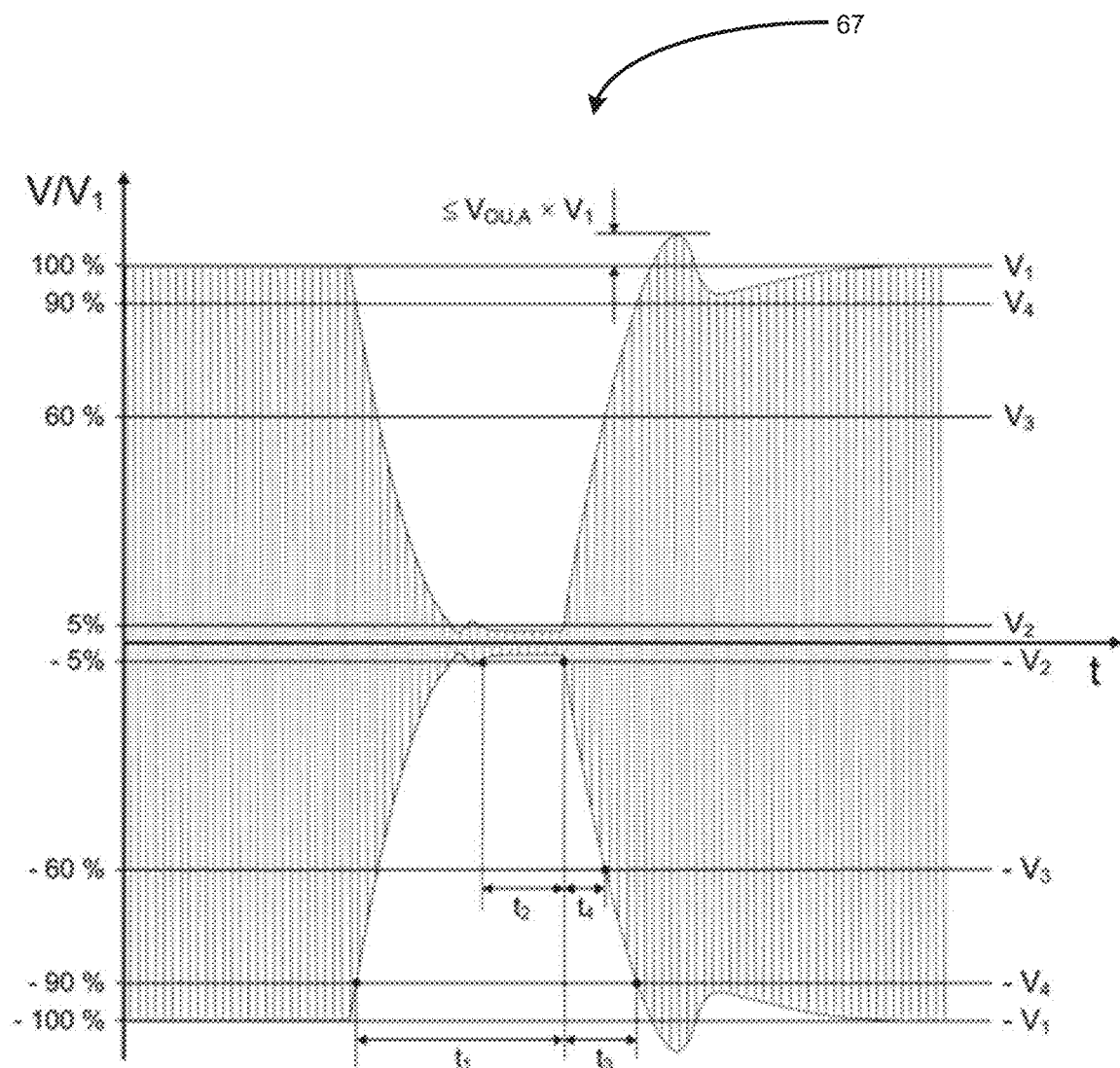
FIG. 8 is an exemplary plot illustrating rise and fall of "on" and "off" conditions when a signal has in-band communications via on-off keying.

For further exemplary illustration, FIG. 8 illustrates a plot for a fall and rise of an OOK in-band signal. The fall time ($t_1$) is shown as the time between when the signal is at 90% voltage ($V_4$) of the intended full voltage ($V_1$) and falls to about 5% voltage ($V_2$) of $V_1$. The rise time ($t_3$) is shown as the time between when the signal ends being at $V_2$ and rises to about $V_4$. Such rise and fall times may be read by a receiving antenna of the signal, and an applicable data communications protocol may include limits on rise and fall times, such that data is non-compliant and/or illegible by a receiver if rise and/or fall times exceed certain bounds.

Returning now to FIGS. 6 and 7, to achieve limitation and/or substantial removal of the mentioned deficiencies, the amplifier 42 includes a damping circuit 60. The damping circuit 60 is configured for damping the AC wireless signal during transmission of the AC wireless signal and associated data signals. The damping circuit 60 may be configured to reduce rise and fall times during OOK signal transmission, such that the rate of the data signals may not only be compliant and/or legible, but may also achieve faster data rates and/or enhanced data ranges, when compared to legacy systems. For damping the AC wireless power signal, the damping circuit includes, at least, a damping transistor 63, which is configured for receiving a damping signal ($V_{damp}$) from the transmission controller 62. The damping signal is configured for switching the damping transistor (on/off) to control damping of the AC wireless signal during the transmission and/or receipt of wireless data signals. Such transmission of the AC wireless signals may be performed by the transmission controller 28 and/or such transmission may be via transmission from the wireless receiver system 30, within the coupled magnetic field between the antennas 21, 31.

In examples wherein the data signals are conveyed via OOK, the damping signal may be substantially opposite and/or an inverse to the state of the data signals. This means that if the OOK data signals are in an "on" state, the damping signals instruct the damping transistor to turn "off" and thus the signal is not dissipated via the damping circuit 60 because the damping circuit is not set to ground and, thus, a short from the amplifier circuit and the current substantially bypasses the damping circuit 60. If the OOK data signals are in an "off" state, then the damping signals may be "on" and, thus, the damping transistor 63 is set to an "on" state and the current flowing of $V_{AC}$ is damped by the damping circuit. Thus, when "on," the damping circuit 60 may be configured to dissipate just enough power, current, and/or voltage, such that efficiency in the system is not substantially affected and such dissipation decreases rise and/or fall times in the OOK signal. Further, because the damping signal may instruct the damping transistor 63 to turn "off" when the OOK signal is "on," then it will not unnecessarily damp the signal, thus mitigating any efficiency losses from $V_{AC}$, when damping is not needed.

As illustrated in FIG. 7, the branch of the amplifier 42 which may include the damping circuit 60, is positioned at the output drain of the amplifier transistor 48. While it is not necessary that the damping circuit 60 be positioned here, in some examples, this may aid in properly damping the output AC wireless signal, as it will be able to damp at the node closest to the amplifier transistor 48 output drain, which is the first node in the circuit wherein energy dissipation is desired. In such examples, the damping circuit is in electrical parallel connection with a drain of the amplifier transistor 48. However, it is certainly possible that the damping circuit be connected proximate to the antenna 21, proximate to the transmission tuning system 24, and/or proximate to a filter circuit 24.

While the damping circuit 60 is capable of functioning to properly damp the AC wireless signal for proper communications at higher power high frequency wireless power transmission, in some examples, the damping circuit may include additional components. For instance, as illustrated, the damping circuit 60 may include one or more of a damping diode $D_{DAMP}$, a damping resistor $R_{DAMP}$, a damping capacitor $C_{DAMP}$, and/or any combinations thereof. $R_{DAMP}$ may be in electrical series with the damping transistor 63 and the value of $R_{DAMP}$ (ohms) may be configured such that it dissipates at least some power from the power signal, which may serve to accelerate rise and fall times in an amplitude shift keying signal, an OOK signal, and/or combinations thereof. In some examples, the value of $R_{DAMP}$ is selected, configured, and/or designed such that $R_{DAMP}$ dissipates the minimum amount of power to achieve the fastest rise and/or fall times in an in-band signal allowable and/or satisfy standards limitations for minimum rise and/or fall times; thereby achieving data fidelity at maximum efficiency (less power lost to $R_{DAMP}$) as well as maintaining data fidelity when the system is unloaded and/or under lightest load conditions.

$C_{DAMP}$ may also be in series connection with one or both of the damping transistor 63 and $R_{DAMP}$. $C_{DAMP}$ may be configured to smooth out transition points in an in-band signal and limit overshoot and/or undershoot conditions in such a signal. Further, in some examples, $C_{DAMP}$ may be configured for ensuring the damping performed is 180 degrees out of phase with the AC wireless power signal, when the transistor is activated via the damping signal.

$D_{DAMP}$ may further be included in series with one or more of the damping transistor 63, $R_{DAMP}$, $C_{DAMP}$, and/or any combinations thereof. $D_{DAMP}$ is positioned, as shown, such that a current cannot flow out of the damping circuit 60, when the damping transistor 63 is in an off state. The inclusion of $D_{DAMP}$ may prevent power efficiency loss in the AC power signal when the damping circuit is not active or "on." Indeed, while the damping transistor 63 is designed such that, in an ideal scenario, it serves to effectively short the damping circuit when in an "off" state, in practical terms, some current may still reach the damping circuit and/or some current may possibly flow in the opposite direction out of the damping circuit 60. Thus, inclusion of $D_{DAMP}$ may prevent such scenarios and only allow current, power, and/or voltage to be dissipated towards the damping transistor 63. This configuration, including $D_{DAMP}$, may be desirable when the damping circuit 60 is connected at the drain node of the amplifier transistor 48, as the signal may be a half-wave sine wave voltage and, thus, the voltage of $V_{AC}$ is always positive.

Beyond the damping circuit 60, the amplifier 42, in some examples, may include a shunt capacitor $C_{SHUNT}$. $C_{SHUNT}$ may be configured to shunt the AC power signal to ground and charge voltage of the AC power signal. Thus, $C_{SHUNT}$ may be configured to maintain an efficient and stable waveform for the AC power signal, such that a duty cycle of about 50% is maintained and/or such that the shape of the AC power signal is substantially sinusoidal at positive voltages.

In some examples, the amplifier 42 may include a filter circuit 65. The filter circuit 65 may be designed to mitigate and/or filter out electromagnetic interference (EMI) within the wireless transmission system 20. Design of the filter circuit 65 may be performed in view of impedance transfer and/or effects on the impedance transfer of the wireless power transmission 20 due to alterations in tuning made by the transmission tuning system 24. To that end, the filter circuit 65 may be or include one or more of a low pass filter, a high pass filter, and/or a band pass filter, among other filter circuits that are configured for, at least, mitigating EMI in a wireless power transmission system.

As illustrated, the filter circuit 65 may include a filter inductor $L_o$ and a filter capacitor $C_o$. The filter circuit 65 may have a complex impedance and, thus, a resistance through the filter circuit 65 may be defined as $R_o$. In some such examples, the filter circuit 65 may be designed and/or configured for optimization based on, at least, a filter quality factor $\gamma_{FILTER}$, defined as:

$$\gamma_{FILTER} = \frac{1}{R_o}\sqrt{\frac{L_o}{C_o}}.$$

In a filter circuit 65 wherein it includes or is embodied by a low pass filter, the cut-off frequency ($\omega_o$) of the low pass filter is defined as:

$$\omega_o = \frac{1}{\sqrt{L_o C_o}}.$$

In some wireless power transmission systems 20, it is desired that the cutoff frequency be about 1.03-1.4 times greater than the operating frequency of the antenna. Experimental results have determined that, in general, a larger $\gamma_{FILTER}$ may be preferred, because the larger $\gamma_{FILTER}$ can improve voltage gain and improve system voltage ripple and timing. Thus, the above values for $L_o$ and $C_o$ may be set such that $\gamma_{FILTER}$ can be optimized to its highest, ideal level (e.g., when the system 10 impedance is conjugately matched for maximum power transfer), given cutoff frequency restraints and available components for the values of $L_o$ and $C_o$.

As illustrated in FIG. 7, the conditioned signal(s) from the amplifier 42 is then received by the transmission tuning system 24, prior to transmission by the antenna 21. The transmission tuning system 24 may include tuning and/or impedance matching, filters (e.g. a low pass filter, a high pass filter, a "pi" or "Π" filter, a "T" filter, an "L" filter, a "LL" filter, and/or an L-C trap filter, among other filters), network matching, sensing, and/or conditioning elements configured to optimize wireless transfer of signals from the wireless transmission system 20 to the wireless receiver system 30. Further, the transmission tuning system 24 may include an impedance matching circuit, which is designed to match impedance with a corresponding wireless receiver system 30 for given power, current, and/or voltage requirements for wireless transmission of one or more of electrical energy, electrical power, electromagnetic energy, and electronic data. The illustrated transmission tuning system 24 includes, at least, $C_{Z1}$, $C_{Z2}$. and (operatively associated with the antenna 21) values, all of which may be configured for impedance matching in one or both of the wireless transmission system 20 and the broader system 10. It is noted that $C_{Tx}$ refers to the intrinsic capacitance of the antenna 21.

Figure 9:
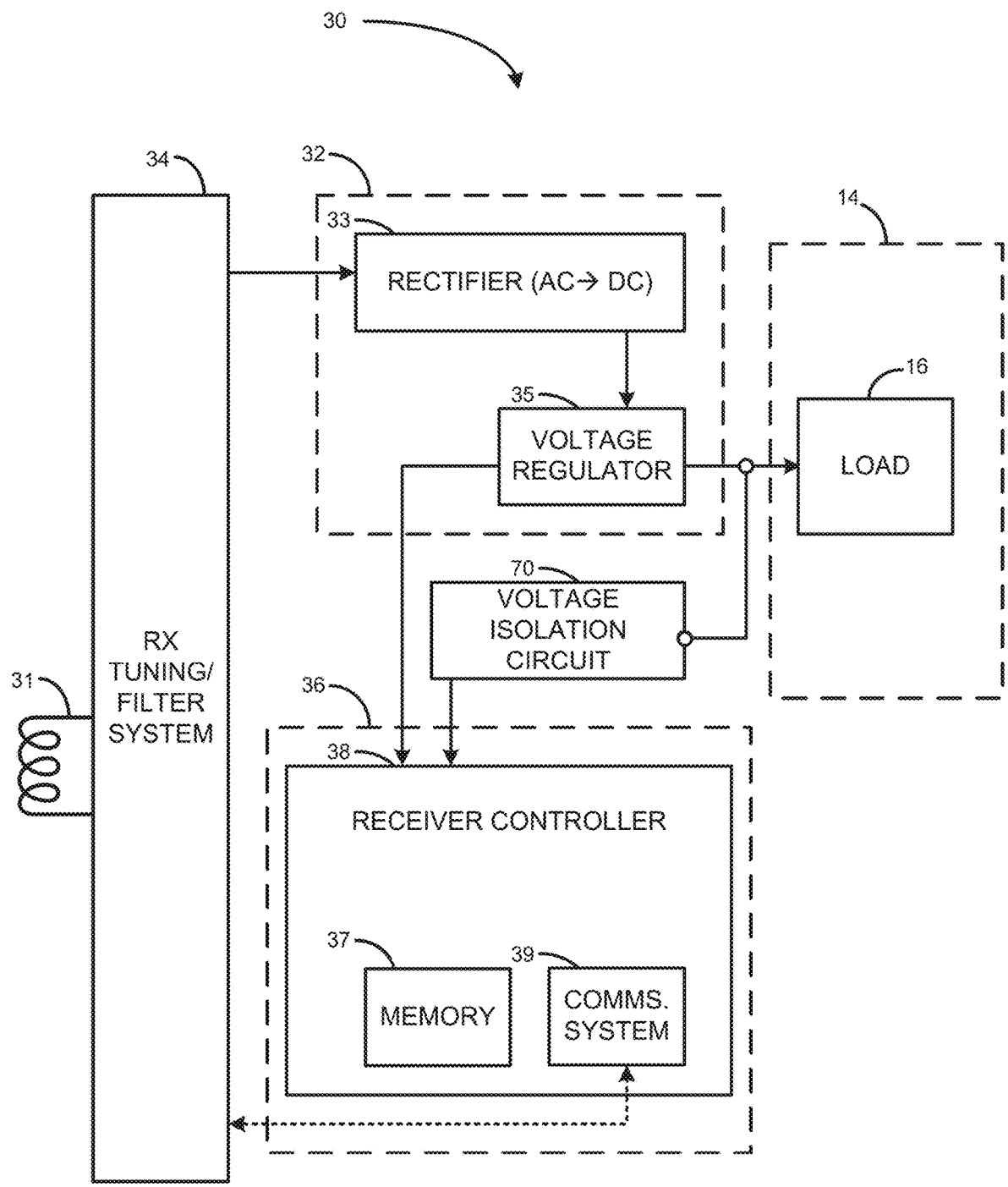
FIG. 9 is a block diagram illustrating components of a receiver control system and a receiver power conditioning system of the wireless receiver system of FIG. 2, in accordance with FIG. 1, FIG. 2, and the present disclosure.

Turning now to FIG. 9 and with continued reference to, at least, FIGS. 1 and 2, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmitter antenna 21. As illustrated in FIG. 9, the wireless receiver system 30 includes, at least, the receiver antenna 31, a receiver tuning and filtering system 34, a power conditioning system 32, a receiver control system 36, and a voltage isolation circuit 70. The receiver tuning and filtering system 34 may be configured to substantially match the electrical impedance of the wireless transmission system 20. In some examples, the receiver tuning and filtering system 34 may be configured to dynamically adjust and substantially match the electrical impedance of the receiver antenna 31 to a characteristic impedance of the power generator or the load at a driving frequency of the transmitter antenna 20.

As illustrated, the power conditioning system 32 includes a rectifier 33 and a voltage regulator 35. In some examples, the rectifier 33 is in electrical connection with the receiver tuning and filtering system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a voltage doubler, a synchronous voltage rectifier, a controlled rectifier, an uncontrolled rectifier, and a half controlled rectifier. As electronic devices may be sensitive to voltage, additional protection of the electronic device may be provided by clipper circuits or devices. In this respect, the rectifier 33 may further include a clipper circuit or a clipper device, which is a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a buck convertor, a low dropout (LDO) regulator, a shunt linear voltage regulator, a step up switching voltage regulator, a step down switching voltage regulator, an invertor voltage regulator, a Zener controlled transistor series voltage regulator, a charge pump regulator, and an emitter follower voltage regulator. The voltage regulator 35 may further include a voltage multiplier, which is as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may an LDO linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 (e.g., when the load 16 is a battery and/or other power source) and/or other components of the electronic device 14.

The receiver control system 36 may include, but is not limited to including, a receiver controller 38, a communications system 39 and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30. The receiver controller 38 may be a single controller or may include more than one controller disposed to control various functions and/or features of the wireless receiver system 30. Functionality of the receiver controller 38 may be implemented in hardware and/or software and may rely on one or more data maps relating to the operation of the wireless receiver system 30. To that end, the receiver controller 38 may be operatively associated with the memory 37. The memory may include one or both of internal memory, external memory, and/or remote memory (e.g., a database and/or server operatively connected to the receiver controller 38 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

Further, while particular elements of the receiver control system 36 are illustrated as subcomponents and/or circuits (e.g., the memory 37, the communications system 39, among other contemplated elements) of the receiver control system 36, such components may be external of the receiver controller 38. In some examples, the receiver controller 38 may be and/or include one or more integrated circuits configured to include functional elements of one or both of the receiver controller 38 and the wireless receiver system 30, generally. As used herein, the term "integrated circuits" generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the receiver controller 38 may be a dedicated circuit configured to send and receive data at a given operating frequency. For example, the receiver controller 38 may be a tagging or identifier integrated circuit, such as, but not limited to, an NFC tag and/or labelling integrated circuit. Examples of such NFC tags and/or labelling integrated circuits include the NTAG® family of integrated circuits manufactured by NXP Semiconductors N.V. However, the communications system 39 is certainly not limited to these example components and, in some examples, the communications system 39 may be implemented with another integrated circuit (e.g., integrated with the receiver controller 38), and/or may be another transceiver of or operatively associated with one or both of the electronic device 14 and the wireless receiver system 30, among other contemplated communication systems and/or apparatus. Further, in some examples, functions of the communications system 39 may be integrated with the receiver controller 38, such that the controller modifies the inductive field between the antennas 21, 31 to communicate in the frequency band of wireless power transfer operating frequency.

Figure 10:
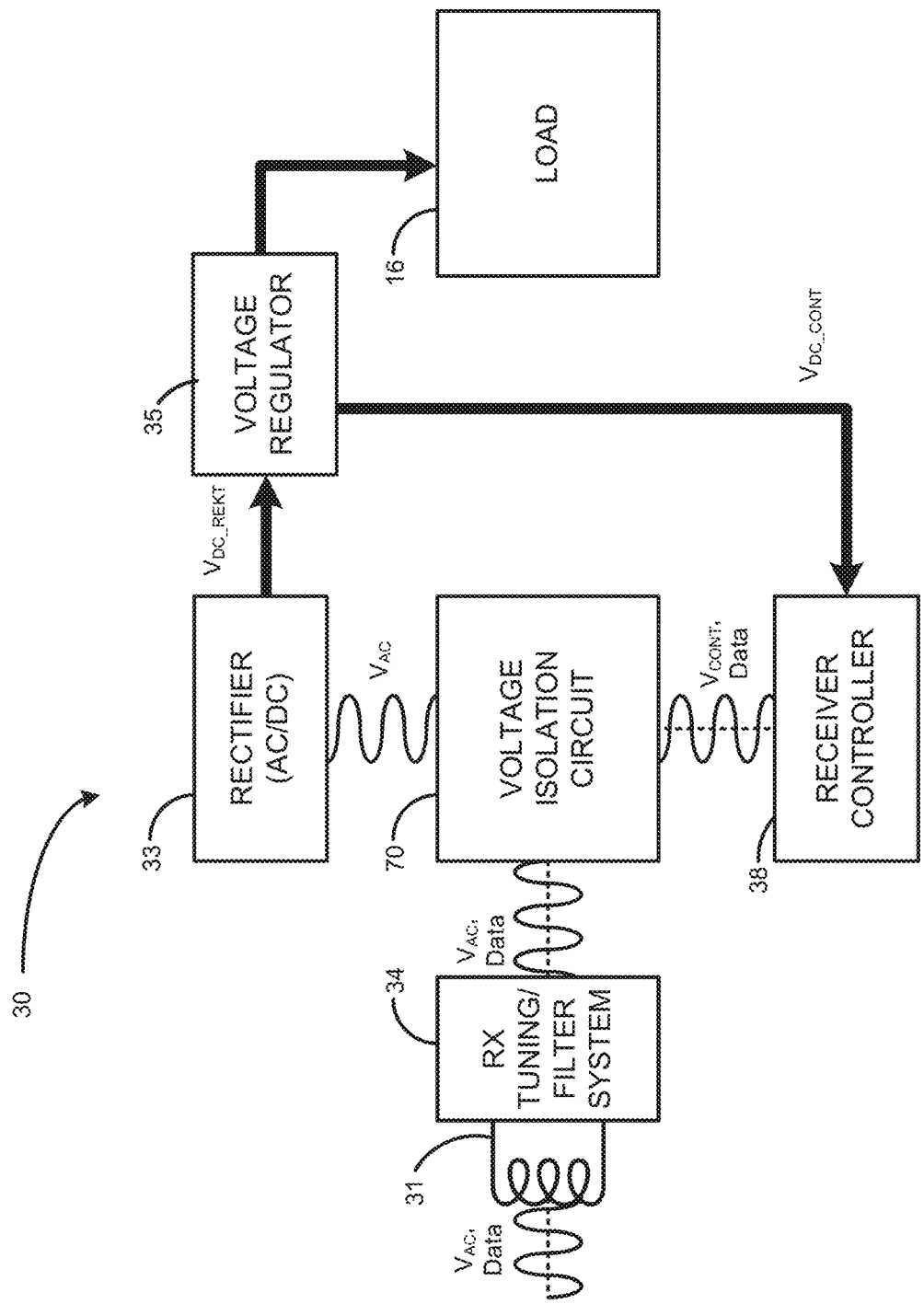
FIG. 10 is a block diagram of elements of the wireless receiver system of FIGS. 1-2 and 9, further illustrating components of an amplifier of the power conditioning system of FIG. 9 and signal characteristics for wireless power transmission, in accordance with FIGS. 1-2, 9, and the present disclosure.
Figure 11:
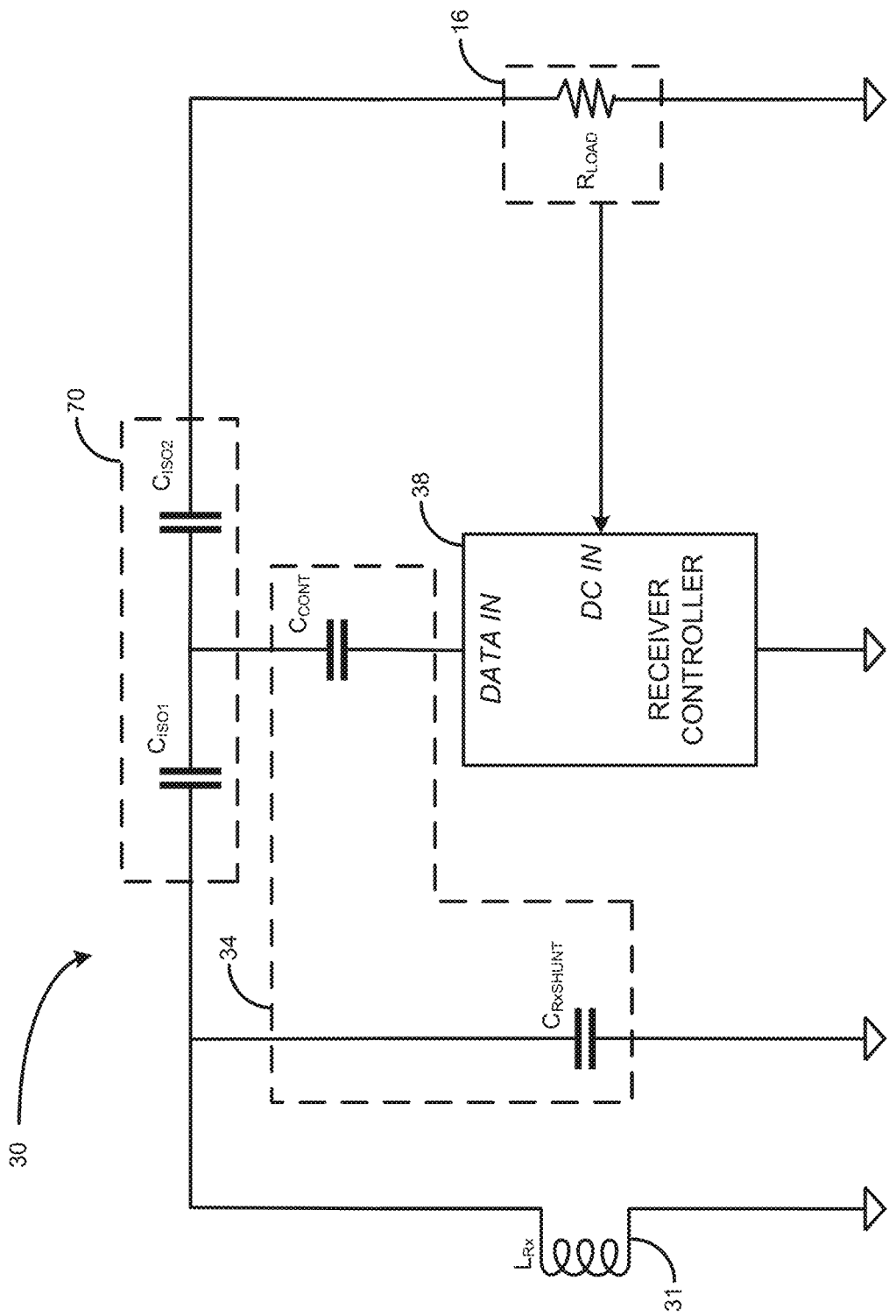
FIG. 11 is an electrical schematic diagram of elements of the wireless receiver system of FIGS. 1-2 and 9-10, further illustrating components of an amplifier of the power conditioning system of FIGS. 9-10, in accordance with FIGS. 1-2, 9-10 and the present disclosure.

Turning now to FIGS. 10 and 11, the wireless receiver system 30 is illustrated in further detail to show some example functionality of one or more of the receiver controller 38, the voltage isolation circuit 70, and the rectifier 33. The block diagram of the wireless receiver system 30 illustrates one or more electrical signals and the conditioning of such signals, altering of such signals, transforming of such signals, rectifying of such signals, amplification of such signals, and combinations thereof. Similarly to FIG. 6, DC power signals are illustrated with heavily bolded lines, such that the lines are significantly thicker than other solid lines in FIG. 6 and other figures of the instant application, AC signals are illustrated as substantially sinusoidal wave forms with a thickness significantly less bolded than that of the DC power signal bolding, and data signals are represented as dotted lines. FIG. 11 illustrates sample electrical components for elements of the wireless transmission system, and subcomponents thereof, in a simplified form. Note that FIG. 11 may represent one branch or subsection of a schematic for the wireless receiver system 30 and/or components of the wireless receiver system 30 may be omitted from the schematic, illustrated in FIG. 11, for clarity.

As illustrated in FIG. 10, the receiver antenna 31 receives the AC wireless signal, which includes the AC power signal ($V_{AC}$) and the data signals (denoted as "Data" in FIG. 10), from the transmitter antenna 21 of the wireless transmission system 20. (It should be understood an example of a transmitted AC power signal and data signal was previously shown in FIG. 6). $V_{AC}$ will be received at the rectifier 33 and/or the broader receiver power conditioning system 32, wherein the AC wireless power signal is converted to a DC wireless power signal ($V_{DC\_REKT}$). $V_{DC\_REKT}$ is then provided to, at least, the load 16 that is operatively associated with the wireless receiver system 30. In some examples, $V_{DC\_REKT}$ is regulated by the voltage regulator 35 and provided as a DC input voltage ($V_{DC\_CONT}$) for the receiver controller 38. In some examples, such as the signal path shown in FIG. 11, the receiver controller 38 may be directly powered by the load 16. In some other examples, the receiver controller 38 need not be powered by the load 16 and/or receipt of $V_{DC\_CONT}$, but the receiver controller 38 may harness, capture, and/or store power from $V_{AC}$, as power receipt occurring in receiving, decoding, and/or otherwise detecting the data signals in-band of $V_{AC}$.

The receiver controller 38 is configured to perform one or more of encoding the wireless data signals, decoding the wireless data signals, receiving the wireless data signals, transmitting the wireless data signals, and/or any combinations thereof. In examples, wherein the data signals are encoded and/or decoded as amplitude shift keyed (ASK) signals and/or OOK signals, the receiver controller 38 may receive and/or otherwise detect or monitor voltage levels of $V_{AC}$ to detect in-band ASK and/or OOK signals. However, at higher power levels than those currently utilized in standard high frequency, NFMC communications and/or low power wireless power transmission, large voltages and/or large voltage swings at the input of a controller, such as the controller 38, may be too large for legacy microprocessor controllers to handle without disfunction or damage being done to such microcontrollers. Additionally, certain microcontrollers may only be operable at certain operating voltage ranges and, thus, when high frequency wireless power transfer occurs, the voltage swings at the input to such microcontrollers may be out of range or too wide of a range for consistent operation of the microcontroller.

For example, in some high frequency higher power wireless power transfer systems 10, when an output power from the wireless power transmitter 20 is greater than 1 W, voltage across the controller 38 may be higher than desired for the controller 38. Higher voltage, lower current configurations are often desirable, as such configurations may generate lower thermal losses and/or lower generated heat in the system 10, in comparison to a high current, low voltage transmission. To that end, the load 16 may not be a consistent load, meaning that the resistance and/or impedance at the load 16 may swing drastically during, before, and/or after an instance of wireless power transfer.

This is particularly an issue when the load 16 is a battery or other power storing device, as a fully charged battery has a much higher resistance than a fully depleted battery. For the purposes of this illustrative discussion, we will assume:

$$V_{AC\_MIN} = I_{AC\_MIN} * R_{LOAD\_MIN}, \text{ and}$$

$$P_{AC\_MIN} = I_{AC} * V_{LOAD\_MIN} = (I_{AC\_MIN})^2 * R_{LOAD\_MIN}$$

wherein $R_{LOAD\_MIN}$ is the minimum resistance of the load 16 (e.g., if the load 16 is or includes a battery, when the battery of the load 16 is depleted), $I_{AC\_MIN}$ is the current at $R_{LOAD\_MIN}$, $V_{AC\_MIN}$ is the voltage of $V_{AC}$ when the load 16 is at its minimum resistance and $P_{AC\_MIN}$ is the optimal power level for the load 16 at its minimal resistance. Further, we will assume:

$$V_{AC\_MAX} = I_{AC\_MAX} * R_{LOAD\_MAX}, \text{ and}$$

$$P_{AC\_MAX} = I_{AC\_MAX} * V_{LOAD\_MAX} = (I_{AC\_MAX})^2 * R_{LOAD\_MAX}$$

wherein $R_{LOAD\_MAX}$ is the maximum resistance of the load 16 (e.g., if the load 16 is or includes a battery, when the battery of the load 16 is depleted), $I_{AC\_MAX}$ is the current at $V_{AC\_MAX}$, $V_{AC\_MAX}$ is the voltage of $V_{AC}$ when the load 16 is at its minimum resistance and $P_{AC\_MAX}$ is the optimal power level for the load 16 at its maximal resistance.

Accordingly, as the current is desired to stay relatively low, the inverse relationship between $I_{AC}$ and $V_{AC}$ dictate that the voltage range must naturally shift, in higher ranges, with the change of resistance at the load 16. However, such voltage shifts may be unacceptable for proper function of the controller 38. To mitigate these issues, the voltage isolation circuit 70 is included to isolate the range of voltages that can be seen at a data input and/or output of the controller 38 to an isolated controller voltage ($V_{CONT}$), which is a scaled version of $V_{AC}$ and, thus, comparably scales any voltage-based in-band data input and/or output at the controller 38. Accordingly, if a range for the AC wireless signal that is an unacceptable input range for the controller 38 is represented by $$V_{AC}=[V_{AC\_MIN}; V_{AC\_MAX}]$$

then the voltage isolation circuit 70 is configured to isolate the controller-unacceptable voltage range from the controller 38, by setting an impedance transformation to minimize the voltage swing and provide the controller with a scaled version of $V_{AC}$, which does not substantially alter the data signal at receipt. Such a scaled controller voltage, based on $V_{AC}$, is $V_{CONT}$, where $$V_{CONT}=[V_{CONT\_MIN}; V_{CONT\_MAX}].$$

While an altering load is one possible reason that an unacceptable voltage swing may occur at a data input of a controller, there may be other physical, electrical, and/or mechanical characteristics and/or phenomena that may affect voltage swings in $V_{AC}$, such as, but not limited to, changes in coupling (k) between the antennas 21, 31, detuning of the system(s) 10, 20, 30 due to foreign objects, proximity of another receiver system 30 within a common field area, among other things.

As best illustrated in FIG. 11, the voltage isolation circuit 70 includes at least two capacitors, a first isolation capacitor $C_{ISO1}$ and a second isolation capacitor $C_{ISO2}$. While only two series, split capacitors are illustrated in FIG. 11, it should also be understood that the voltage isolation circuit may include additional pairs of split series capacitors. $C_{ISO1}$ and $C_{ISO2}$ are electrically in series with one another, with a node therebetween, the node providing a connection to the data input of the receiver controller 38. $C_{ISO1}$ and $C_{ISO2}$ are configured to regulate $V_{AC}$ to generate the acceptable voltage input range $V_{CONT}$ for input to the controller. Thus, the voltage isolation circuit 70 is configured to isolate the controller 38 from $V_{AC}$, which is a load voltage, if one considers the rectifier 33 to be part of a downstream load from the receiver controller 38.

In some examples, the capacitance values are configured such that a parallel combination of all capacitors of the voltage isolation circuit 70 (e.g. $C_{ISO1}$ and $C_{ISO2}$) is equal to a total capacitance for the voltage isolation circuit ($C_{TOTAL}$). Thus, $$C_{ISO1} \| C_{ISO2} = C_{TOTAL},$$

wherein $C_{TOTAL}$ is a constant capacitance configured for the acceptable voltage input range for input to the controller. $C_{TOTAL}$ can be determined by experimentation and/or can be configured via mathematical derivation for a particular microcontroller embodying the receiver controller 38.

In some examples, with a constant $C_{TOTAL}$, individual values for the isolation capacitors $C_{ISO1}$ and $C_{ISO2}$ may be configured in accordance with the following relationships:

$$C_{ISO1} = \frac{C_{TOTAL} * (1 + t_v)}{t_v}, \text{ and}$$

$$C_{ISO2} = C_{TOTAL} * (1 + t_v).$$

wherein $t_v$ is a scaling factor, which can be experimentally altered to determine the best scaling values for $C_{ISO1}$ and $C_{ISO2}$, for a given system. Alternatively, $t_v$ may be mathematically derived, based on desired electrical conditions for the system. In some examples (which may be derived from experimental results), $t_v$ may be in a range of about 3 to about 10.

FIG. 11 further illustrates an example for the receiver tuning and filtering system 34, which may be configured for utilization in conjunction with the voltage isolation circuit 70. The receiver tuning and filtering system 34 of FIG. 11 includes a controller capacitor $C_{CONT}$, which is connected in series with the data input of the receiver controller 38. The controller capacitor is configured for further scaling of $V_{AC}$ at the controller, as altered by the voltage isolation circuit 70. To that end, the first and second isolation capacitors, as shown, may be connected in electrical parallel, with respect to the controller capacitor.

Additionally, in some examples, the receiver tuning and filtering system 34 includes a receiver shunt capacitor $C_{RxSHUNT}$, which is connected in electrical parallel with the receiver antenna 31. $C_{RxSHUNT}$ is utilized for initial tuning of the impedance of the wireless receiver system 30 and/or the broader system 30 for proper impedance matching and/or $C_{RxSHUNT}$ is included to increase the voltage gain of a signal received by the receiver antenna 31.

The wireless receiver system 30, utilizing the voltage isolation circuit 70, may have the capability to achieve proper data communications fidelity at greater receipt power levels at the load 16, when compared to other high frequency wireless power transmission systems. To that end, the wireless receiver system 30, with the voltage isolation circuit 70, is capable of receiving power from the wireless transmission system that has an output power at levels over 1 W of power, whereas legacy high frequency systems may be limited to receipt from output levels of only less than 1 W of power. For example, in legacy NFC-DC systems, the poller (receiver system) often utilizes a microprocessor from the NTAG family of microprocessors, which was initially designed for very low power data communications. NTAG microprocessors, without protection or isolation, may not adequately and/or efficiently receive wireless power signals at output levels over 1 W. However, inventors of the present application have found, in experimental results, that when utilizing voltage isolation circuits as disclosed herein, the NTAG chip may be utilized and/or retrofitted for wireless power transfer and wireless communications, either independently or simultaneously.

To that end, the voltage isolation circuits disclosed herein may utilize inexpensive components (e.g., isolation capacitors) to modify functionality of legacy, inexpensive microprocessors (e.g., an NTAG family microprocessor), for new uses and/or improved functionality. Further, while alternative controllers may be used as the receiver controller 38 that may be more capable of receipt at higher voltage levels and/or voltage swings, such controllers may be cost prohibitive, in comparison to legacy controllers. Accordingly, the systems and methods herein allow for use of less costly components, for high power high frequency wireless power transfer.

Figure 12A:
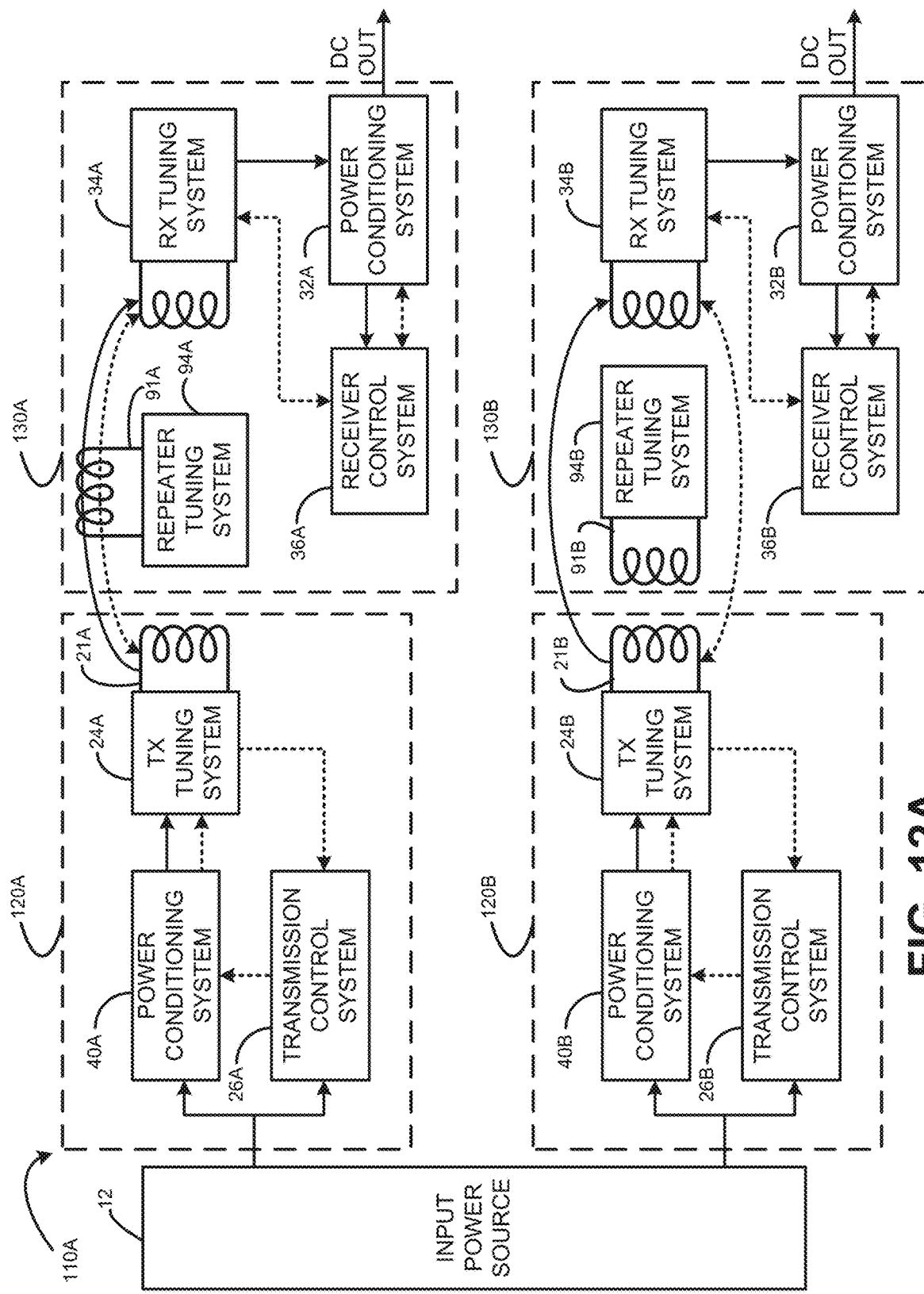
FIG. 12A is a block diagram illustrating components of another wireless transmission system of the system and another wireless receiver system, including like or similar elements to those of FIGS. 1-7 and 9-11, in accordance with FIGS. 1-7, 9-11 and the present disclosure.

FIG. 12A is a block diagram for a wireless power transfer system 110B, which includes one or more same or similar elements, to those elements of FIGS. 1-7, 9-11. Accordingly, elements of the wireless power transfer system 110 include like reference numbers to corresponding elements of FIGS. 1-7, 9-11 and share a common detailed description. As illustrated, the system of FIG. 12A may include two wireless transmission systems 120A, 120B and two wireless receiver system 130A, 130B. Similar to the wireless transmission system 20 of FIGS. 1-7, each wireless power transmission system 120A, 120B, respectively, includes a transmitter antenna 21A, 21B, a transmitter tuning system 24A, 24B, a transmission control system 26A, 26B, and a power conditioning system 40A, 40B. Further, similar to the wireless receiver system 30 of FIGS. 9-11, the wireless receiver systems 130A, 130B include, respectively, a receiver antenna 31A, 31B, a receiver tuning system 34A, 34B, a receiver control system 36A, 36B, and a power conditioning system 32A, 32B.

Additionally, the wireless receiver systems 130 include a repeater antenna 91 and an associated repeater tuning system 94. As defined herein, a "repeater" is an antenna that is configured to relay magnetic fields emanating between a transmitter antenna 21 and one or both of a receiver antenna 31 and one or more other repeater antennas 91. Thus, the repeater antenna 91 is configured to relay electrical energy and/or data via NMFC from the transmitter antenna 21 to the receiver antenna 31. In one or more embodiments, the repeater antenna 91 comprises an inductor coil capable of resonating at a frequency that is about the same as the resonating frequency of the transmitter antenna 21 and the receiver antenna 31.

The repeater tuning system 94 may include similar or like elements to those of the transmitter tuning system 24 and the receiver tuning system 34. However, in some embodiments, coupling, between the transmitter antenna 21 and the repeater antenna 91, should be of a relatively low value, such that an acceptable transfer impedance can be maintained within the wireless power transfer system 110, for proper operation of the wireless receiver system 130. In such examples, the repeater tuning system 94 may be configured to satisfy the aforementioned coupling and/or impedance transfer conditions. In some additional or alternative examples, an interdigitated capacitor(s) may be used as part of the repeater tuning system 94 to tune the repeater antenna 91, in lieu of surface mount capacitors. Interdigitated capacitors may provide mechanical robustness, relatively thin form factor design, and/or reduced cost, in comparison to surface mount capacitors.

As illustrated, in some embodiments of the system 110A, the wireless receiver systems 120A, 120B may be configured such that the first wireless receiver system 130A receives a power signal from the transmitter antenna 21A at the receiver antenna 31A, by way of the power signal being repeated by the repeater antenna 91A, whereas the second wireless receiver system 130B receives a power signal directly from the transmitter antenna 21B at the receiver antenna 31B. As illustrated, the power signals and data signals are transmitted from the transmission antenna 21A, to the repeater antenna 91A, then repeated to the receiver antenna 31A; however, it is certainly possible that the power signals may also transfer directly from the transmitter antenna 21A to the receiver antenna 31A, while the repeater antenna 91A also couples with the receiver antenna 31A and transmits the repeated power signal to the receiver antenna 31A.

Alternatively, without altering the physical electronic connections of any of the systems 110, 120, 130, the wireless receiver systems 130 may be configured such that the first wireless receiver system 130A receives a power signal directly from the transmitter antenna 21A at the receiver antenna 31A, whereas the second wireless receiver system 130B receives a power signal from the transmitter antenna 21B at the receiver antenna 31A, by way of the power signal being repeated by the repeater antenna 91B. It is to be noted that the repeater antenna(s) 91 and its associated repeater tuning system 94 may maintain no physical, electrical connections with other elements of the wireless receiver system 130 and may only electrically connect with other components, such as the receiver antenna 31 and the transmitter antenna 21, via NFMC.

Figure 12B:
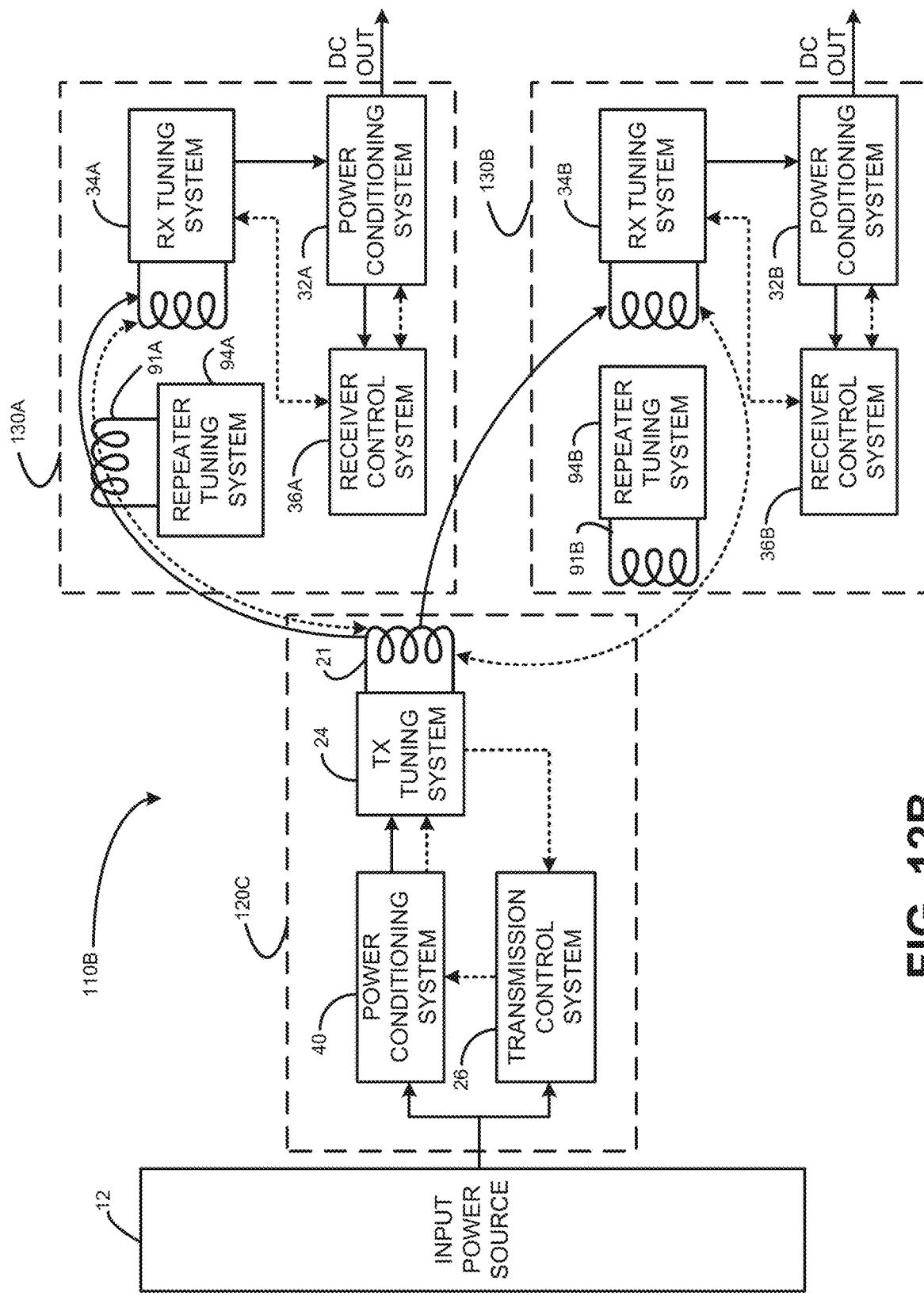
FIG. 12B is a block diagram illustrating components of another wireless transmission system of the system and another wireless receiver system, including like or similar elements to those of FIGS. 1-7 and 9-12A, in accordance with FIGS. 1-7, 9-12A and the present disclosure.

Turning now to FIG. 12B, a block diagram for a wireless power transfer system 110B, which includes one or more same or similar elements, to those elements of FIGS. 1-7, and 9-12A. Accordingly, elements of the wireless power transfer system 110B include like reference numbers to corresponding elements of FIGS. 1-7, 9-12A and share a common detailed description. As illustrated, the system of FIG. 12B may include the two wireless receiver system 130A, 130B; however, in contrast to the system 110A of FIG. 12A, both of the wireless receiver systems 130A, 130B receive electrical signals from a common wireless transmission system 21C. Similar to the wireless transmission system 20 of FIGS. 1-7, the wireless power transmission system 120C includes a transmitter antenna 21C, a transmitter tuning system 24C, a transmission control system 26C, and a power conditioning system 40C.

As illustrated, in some embodiments of the system 110B, the wireless receiver systems 120A, 120B may be configured such that the first wireless receiver system 130A receives a power signal from the transmitter antenna 21C at the receiver antenna 31A, by way of the power signal being repeated by the repeater antenna 91A, whereas the second wireless receiver system 130B receives a power signal directly from the transmitter antenna 21C at the receiver antenna 31B. As illustrated, the power signals and data signals are transmitted from the transmission antenna 21, to the repeater antenna 91A, then repeated to the receiver antenna 31A; however, it is certainly possible that the power signals may also transfer directly from the transmitter antenna 21 to the receiver antenna 31A, while the repeater antenna 91A also couples with the receiver antenna 31A and transmits the repeated power signal to the receiver antenna 31A.

Alternatively, without altering the physical electronic connections of any of the systems 110, 120, 130, the wireless receiver systems 130 may be configured such that the first wireless receiver system 130A receives a power signal directly from the transmitter antenna 21C at the receiver antenna 31A, whereas the second wireless receiver system 130B receives a power signal from the transmitter antenna 21C at the receiver antenna 31A, by way of the power signal being repeated by the repeater antenna 91B. It is to be noted that the repeater antenna(s) 91 and its associated repeater tuning system 94 may maintain no physical, electrical connections with other elements of the wireless receiver system 130 and may only electrically connect with other components, such as the receiver antenna 31 and the transmitter antenna 21, via NFMC.

Figure 13A:
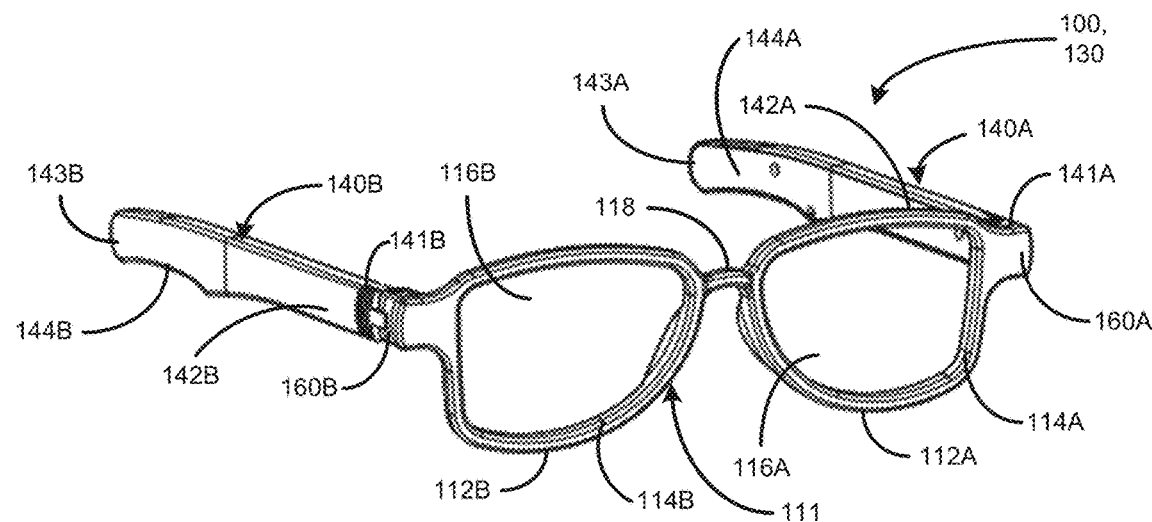
FIG. 13A is a front perspective view of eyewear, the eyewear including a wireless receiver system, in accordance with the wireless receiver systems disclosed herein and in accordance with of FIGS. 1-7, 9-12B, and the present disclosure.
Figure 13B:
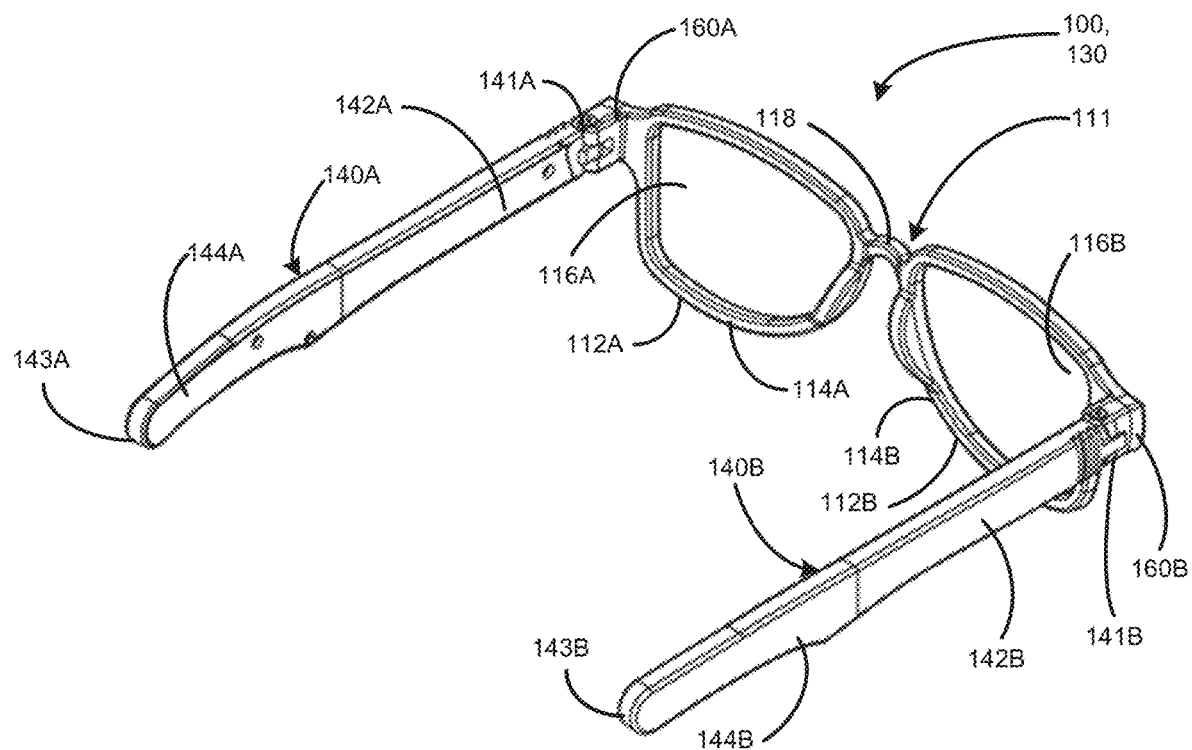
FIG. 13B is a rear perspective view of the eyewear of FIG. 13A, in accordance with FIGS. 1-7, 9-13A, and the present disclosure.

Turning now to FIGS. 13A and 13B, eyewear 100 is illustrated, respectively, in a front perspective view and a rear perspective view. The wireless receiver system 130 and/or any components thereof may be integrated within the eyewear 100, such that electronic components within and/or associated with the eyewear can receive power from a wireless transmission system 120, via the wireless receiver system 130. As used herein, "eyewear" refers to any face-wearable accessory and/or device that covers, at least in part, at least one eye of a user. Eyewear may include, but is not limited to including, eyeglasses, prescription eyeglasses, reading glasses, fashion glasses, electronic glasses, sunglasses, smart glasses with integrated electronics, speaker enabled glasses, altered or augmented reality (AR) glasses, virtual reality (VR) glasses, glasses with screens and/or projectors within lenses or associated with lenses, among other contemplated eyewear. The wireless receiver system(s) 130 integrated with the eyewear 100 may be utilized to charge a battery or other storage device of or associated with the eyewear 100 and/or the wireless receiver system 130 may be configured to directly power one or more components or devices of or associated with the eyewear 130. Such components or devices include, but are not limited to including, electronic circuits, visual feedback devices, displays, screens, projection devices, audio feedback devices, haptic feedback devices, speakers, earphones, microphones, sound capturing devices, vibrating devices, visual indicators, microprocessors, computers, bone conduction devices, infrared scanning devices, light producing or projecting devices, among other contemplated electronic components or devices.

The eyewear 100 includes a front face 110, which defines, at least, first and second eyewires 112A, 112B. The eyewires 112A, 112B may be any structural members configured for surrounding, at least in part, outer edges of lenses 116 of the eyewear 100 or associated with the eyewear 100. The eyewires 112 may be comprised of any suitable material known in the art, such as, but not limited to, a plastic, a polymer, a metal, a 3-D printed or additive manufactured material, wood, laminate, and glass, among other materials. In some examples, the eyewires 112 may be referred to as "rims" surrounding said lenses. Lenses, as defined herein, refer to any fully or partially transparent or translucent material configured to be positioned, at least in part, in front of at least one eye of a user of the eyewear 100, when positioned relative to the user's at least one eye. Example lenses include, but are not limited to including prescription lenses, non-prescription or "dummy" lenses, sunglass lenses, transition lenses, smart lenses, lenses including visual display elements, lenses configured for projection thereupon by a display device, among other, in full or in part, transparent or translucent materials. In some examples, the eyewires 112 may define one or more mechanical features, such as a bezel 114, configured to mate with edges of the lenses 116, such that the lenses 116 are held in place, relative to their respective, associated, eyewires 112. Each of the eyewires 112 may be connected by a bridge 118. The bridge 118 may be configured to rest on a user's nose or nose bridge, when the eyewear 100 is worn by the user.

The eyewear 100 includes a first arm 140A and a second arm 140B. The arms 140 are any structural member of the eyewear 100 configured to extend in a distal direction from the front face 111. The arms 140 may be configured to position the front face 111 and/or the lenses 116 in front of at least one eye of the user, when the user is wearing the eyewear 100. The arms 140 may be structural members referenced in the art as "temples." The arms 140 may be connected to the front face 111 by hinges 160. The hinges 160 may be mechanically configured, such that the arms 140 are foldable, with respect to the front face 111. When the arms 140 are folded, which ever arm 140 is first folded inward towards the front face 111 will be in closer proximity to the front face 111 than the other arm 140.

While the eyewear 100 is illustrated in this particular configuration, it is certainly contemplated that other configurations are possible and may have the wireless receiver system(s) 130 integrated therein; such configurations include, at least, a front face 111 and first and second arms 140A, 140B. For example, the eyewear 100 may omit the lenses 116 and leave the space within the eyewires 112 open. Alternatively, in some examples, the front face 111 may define a "rim-less" front face, wherein the eyewires 112 are omitted and lenses 116 comprise a majority of the front face 110, with the bridge 118 connecting the lenses 116 together and the hinges 160 connecting the arms 140 thereto. Such configurations are merely exemplary and other configurations for the eyewear 100, which include, at least, a front face 111 and arms 140, are certainly contemplated.

The first arm 140A extends from a first proximal end 141A to a first distal end 143A, wherein the first proximal end 141A is proximal to the front face 111. The first arm 140A includes a first forward portion 142A and a first distal portion 144A. The first forward portion 142A may be any portion of the first arm 140A extending distally from the first proximal end 141A and the first distal portion 144A may be any portion of the arm 140A extending distally from the first forward portion 142A. Similarly, the second arm 140B extends from a second proximal end 141B to a second distal end 143B, wherein the second proximal end is proximal to the front face 111. The second arm 140B includes a second forward portion 142B and a second distal portion 144B. The second forward portion 142B may be any portion of the second arm 140B extending distally from the second proximal end 141B and the second distal portion 144B may be any portion of the arm 140B extending distally from the second forward portion 142B.

Figure 14A:
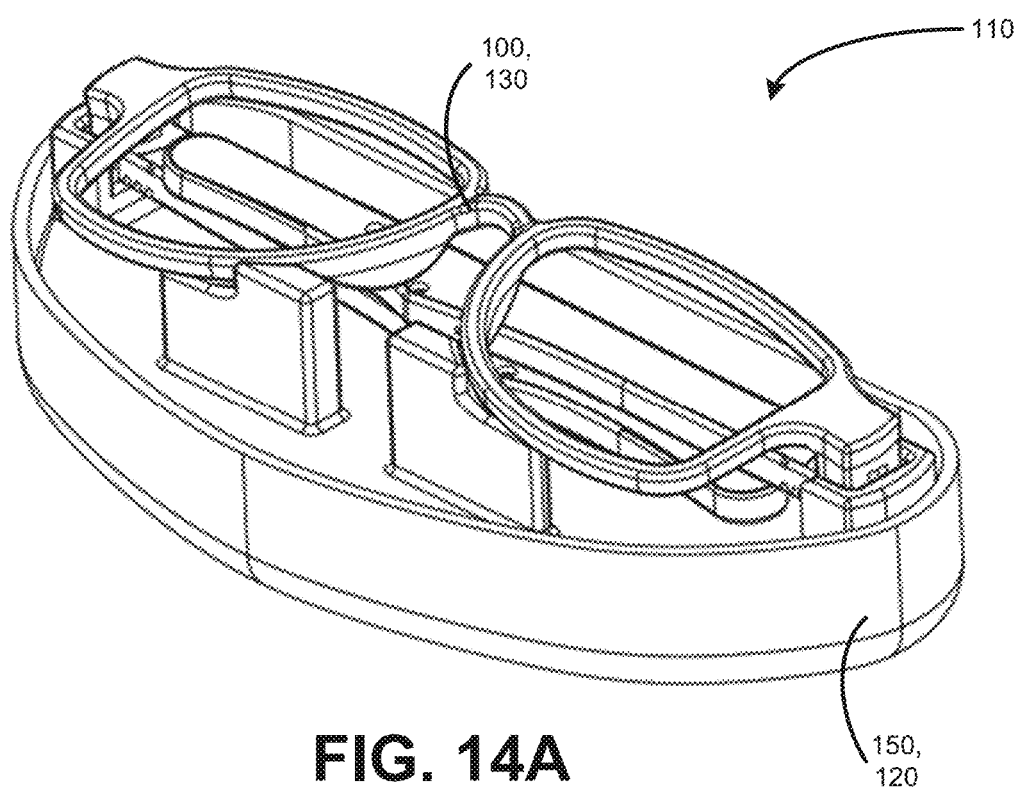
FIG. 14A is a front perspective view of the eyewear of FIGS. 13, with arms of the eyewear folded and the eyewear placed in or on a receptacle for the eyewear, the receptacle including a wireless transmission system, in accordance with the wireless transmission systems herein and in accordance with of FIGS. 1-7, 9-13, and the present disclosure.

FIG. 14A illustrates the eyewear 100 of FIG. 13 resting in or on a receptacle 110, which includes the wireless transmission system 120 integrated and/or operatively associated with the receptacle 150. The receptacle 150 may be any surface, device, and/or container in which the eyewear 100 interacts, such that the integrated wireless receiver system 130 and the integrated wireless transmission system 120 are capable of coupling for wireless power transfer. Receptacles 120 may include, but are not limited to including, cases, pouches, holders, stands, and surfaces, among other things. It is to be noted that the form-factors illustrated for the eyewear 100 and/or the receptacle 150 are merely exemplary and are not intended to limit the scope of the disclosure; other form factors for eyewear 100 and/or receptacle(s) 150 are certainly contemplated.

Figure 14B:
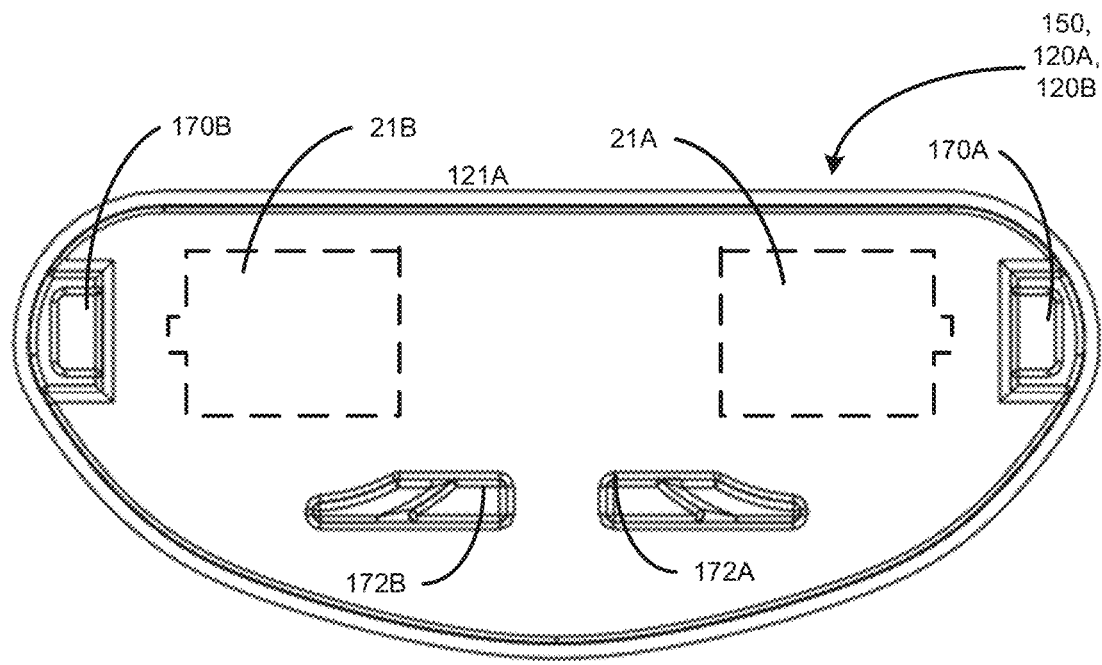
FIG. 14B is a top view of an embodiment of the receptacle of FIG. 14A, illustrating elements of its associated wireless transmission system, in accordance with FIGS. 1-7, 9-14A, and the present disclosure.

FIG. 14B is a top view of an exemplary top surface of the receptacle 150, wherein the wireless transmission systems 120A, 120B, of FIG. 12A are integrated with or within the receptacle 150. As illustrated, the receptacle may include one or more first mechanical features 170 and/or one or more second mechanical features 172, each configured to receive, mate, hold, position, and or otherwise mechanically interact with the eyewear 100, such that the eyewear 100 will be in position to receive wireless power signals, via the wireless receiver system(s) 130, from the wireless transmission system(s) 120. For example, the first mechanical features 170 may be configured to mechanically interact with one or more of the hinges 160 and the arms 140 of the eyewear 100. In some examples, the second mechanical features 172 may be configured to mechanically interact with the front face 111 of the eyewear 100.

Figure 14C:
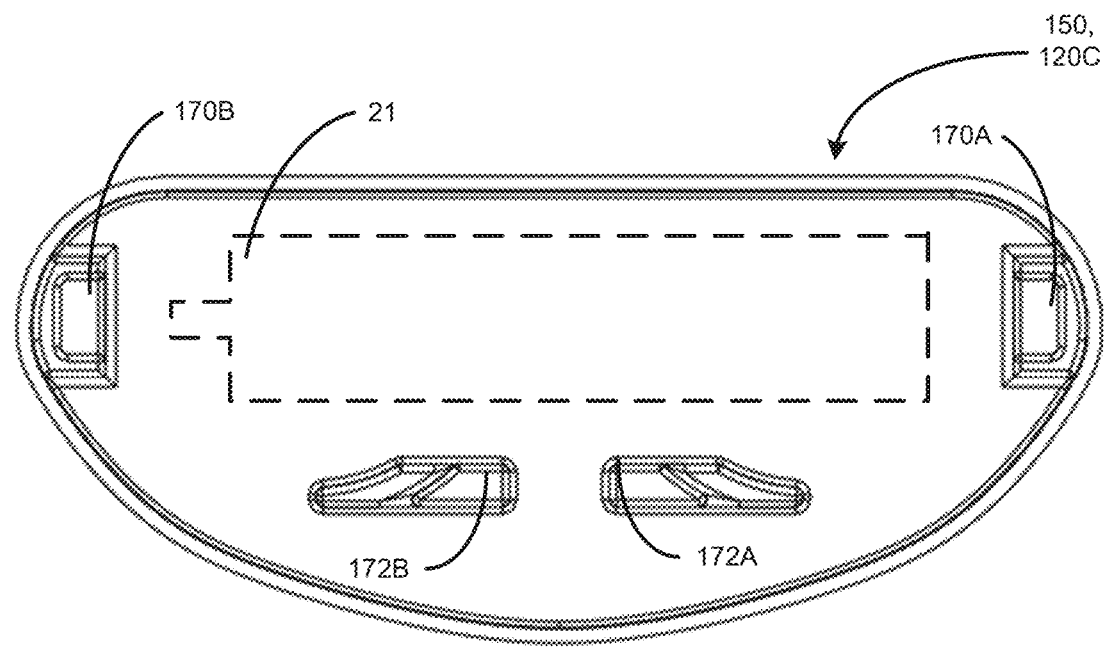
FIG. 14C is a top view of another embodiment of the receptacle of FIG. 14A, illustrating one or more elements of its associated wireless transmission system, in accordance with FIGS. 1-7, 9-14A, and the present disclosure.

As illustrated in FIG. 14B, when the system 110A is utilized with one or both of the eyewear 100 and the receptacle 150 for providing wireless power to the eyewear 100, two transmission antennas 21A, 21B, of the two wireless transmission systems 120A, 120B, respectively, are included. FIG. 14B shows, in the dashed lines, example positioning of the transmitter antennas 21A, 21B, relative to the receptacle 150 and any surfaces thereof. Alternatively, as illustrated in FIG. 14C, when the system 110B is utilized with one or both of the eyewear 100 and the receptacle 150 for providing wireless power to the eyewear 100, a single transmission antenna 21 is utilized, which may transmit wireless power signals to multiple wireless receiver systems 130 simultaneously.

Figure 14D:
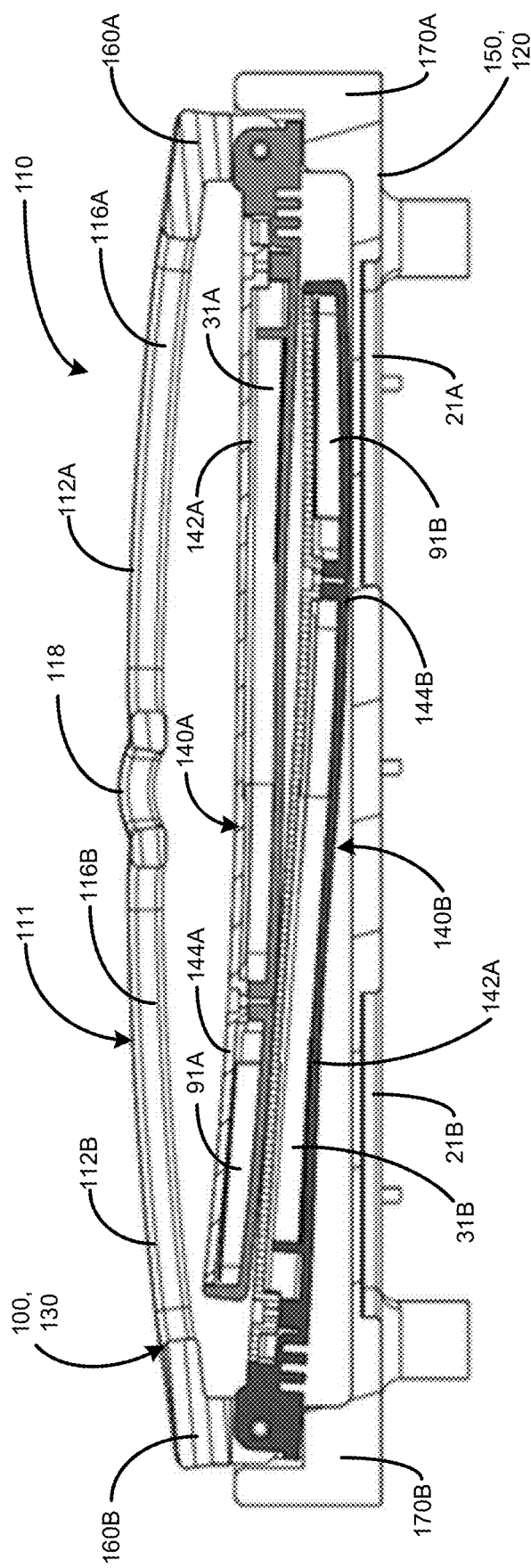
FIG. 14D is a cross sectional view of the eyewear and receptacle of FIG. 14A, illustrating placement of antennas associated with the wireless receiver system associated with the eyewear and the wireless transmission system associated with the receptacle, in accordance with FIGS. 1-7, 9-14B, and the present disclosure.

Turning now to FIG. 14D, and with continued reference to FIGS. 12A, 13, and 14A-B, a cross sectional view of the eyewear 100 and receptacle 150 is illustrated, showing mechanical positioning of components thereof and antenna placement therein, for antennas 21, 31, 91 of the wireless transmission systems 120A, B and the wireless receiver systems 130A, 130B. In the example configuration of FIG. 14D, the first arm 140A of the eyewear 100 has been folded inward first and, thus, is in closer proximity to the front face 111, compared to the distance between the second arm 140B and the front face 110. Also, in such an arm folding configuration, the second arm 140B will be in closer proximity to one or more transmission antennas 21 associated with the receptacle 150.

As discussed above with reference to FIG. 12A, the first wireless receiver system 130A is configured to receive wireless power signals from the first transmission antenna 21A at the first receiver antenna 31A, as repeated wireless power signals via repeating of the wireless power signals by the first repeater antenna 91A; whereas, the second wireless receiver system 130B is configured to receive wireless power signals from the second transmission antenna 21B directly from the second transmission antenna 21B, without need for repeating the signal by the second repeater antenna 91B. Alternatively, had the second arm 140B been folded inward towards the front face 111 first, the second wireless receiver system 130B would be configured to receive wireless power signals from the second transmission antenna 21B at the second receiver antenna 21B, as repeated wireless power signals via repeating of the wireless power signals by the second repeater antenna 91B; whereas, the first wireless receiver system 130A would be configured to receive wireless power signals from the first transmission antenna 21A directly from the first transmission antenna 21A, without need for repeating the signal by the first repeater antenna 91A.

Figure 15A:
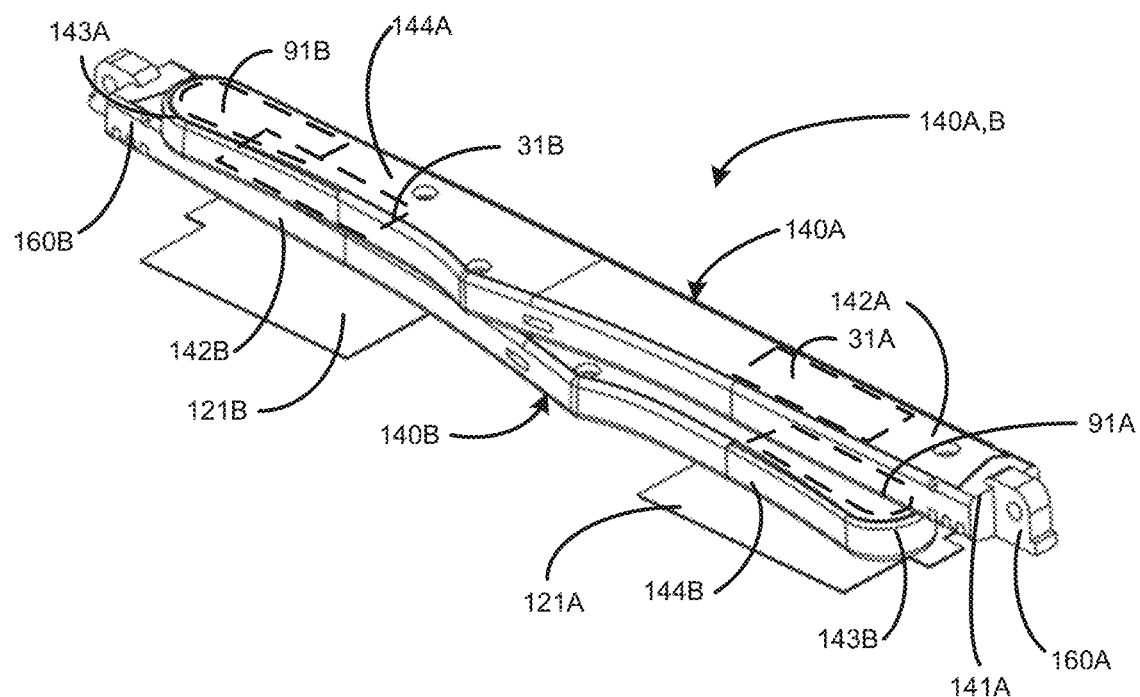
FIG. 15A is a side perspective view of the arms of the eyewear of FIGS. 13-14A and the antennas of FIGS. 13-14B, in accordance with FIGS. 1-7, 9-14B, and the present disclosure.
Figure 15B:
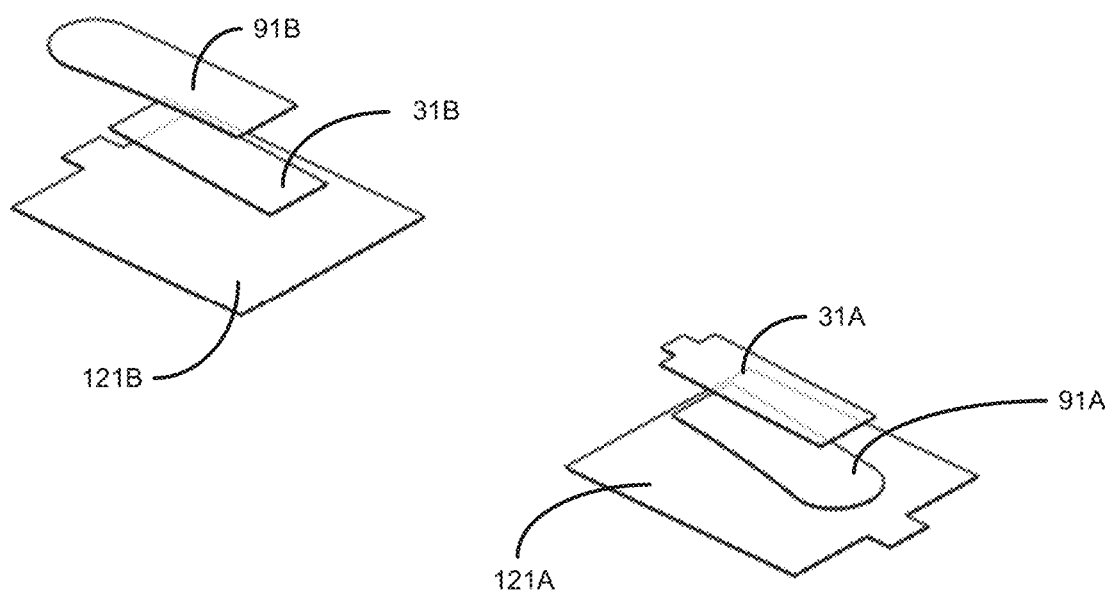
FIG. 15B is a side perspective view illustration of the antenna placement in FIG. 15A, illustrated with elements of the arms removed, in accordance with FIGS. 1-7, 9-14B, 15A, and the present disclosure.

Antenna placement for the systems 120, 130 is further illustrated in FIGS. 15A-B; FIG. 15A shows a perspective view of the arms 140 and antenna placements therein and FIG. 15B shows a perspective view of the antennas of the systems 120, 130, with elements of the eyewear invisible or not shown. The first and second receiver antennas 31A, B may be, respectively, positioned proximal or positioned within the first and second forward portions 142A, B of the arms 140A, B. The first and second repeater antennas 91A, B may be, respectively, positioned proximal or positioned within the first and second distal portions 144A, B of the arms 140A, B. The combination of the antenna placement, relative to the arms 140, and utilization of the repeater antennas 91 enables greater positional flexibility, for arm 140 positioning, with respect to the receptacle 150, for wireless power transfer. Such positional flexibility may reduce or eliminate adverse effects on user experience or wireless power transfer capabilities.

Utilization of the wireless receiver system(s) 130, with respect to the antenna placement relative to components of the eyewear 100, may result in wireless power integration in eyewear and an associated charging receptacle, without introducing unnecessary bulk and/or weight in the eyewear 100. Inclusion of the antennas 31, 91 disclosed herein may result in the eyewear 100 having its mass or weight minimized, by limiting layers and/or turns of the antennas 31, 91 and, thus, the amount of metal needed for the antennas 31, 91, while still maintaining the large separation gaps necessary for positional freedom. Separation gaps, between the transmission antenna 21 and the receiver antenna 31, that are achieved utilizing the systems and methods disclosed herein may be in a range of about 5 millimeters (mm) to about 15 mm.

Such a reduction in weight, while maintaining the separation distance, may be achieved by utilizing the repeater antennas 91 disclosed herein. Inexpensive, light weight antennas may be used to realize the repeater antenna, such as, but not limited to, a wire wound antenna or a PCB antenna; thus, weight or user experience is not adversely impacted by inclusion of the repeater antenna. In some examples, the repeater antenna 91 may be a simple conductor, such as a piece of metal, configured or tuned to repeat a wireless power signal to the receiver antenna 31. Accordingly, in some such examples, the simple conductor as the repeater antenna 91 may be a conductive addition and/or part of the eyewear 100, such as a piece of metal on an arm 140 of the eyewear 100.

While it would be possible to not include the repeater antenna 91 and still achieve the necessary separation distance for achieving positional freedom, the receiver antennas necessary to enable such separation distances would require one or more of excess of turns, excess of layers, additional or greater magnetics shielding materials (e.g., a ferrite, a polymer, among other shielding materials), and combinations thereof. Such bulkier antennas are unnecessary in the systems and apparatus disclosed herein, as the inclusion of the repeater antenna will obviate the need for such bulkier, more metal intensive and/or shielding material intensive antennas, while achieving desired positional flexibility. Further, such use of the receiver/repeater antenna combination may result in lower bill of materials (BOM) cost for the wireless power system of the end user device.

Additionally, inclusion of the repeater antenna 91 may provide for improved thermal performance, during wireless power transfer over the wireless power transfer system 110. The repeater antenna 91 may reduce output power drive requirements of the power conditioning system 40, as including the repeater antenna 91 may increase an effective mutual inductance of the wireless power transfer system 110; due to the increase in mutual inductance, the output current of the wireless transmission system(s) 120 can be lowered, compared to wireless power transmission systems that do not include a repeater antenna in the signal path of the wireless power signals transferred therein. Thus, the inclusion of the repeater antenna 91 may further reduce thermal constraints and/or prevent unnecessary heating in the system 110, while maintaining the increased separation distances discussed above.

Figure 16A:
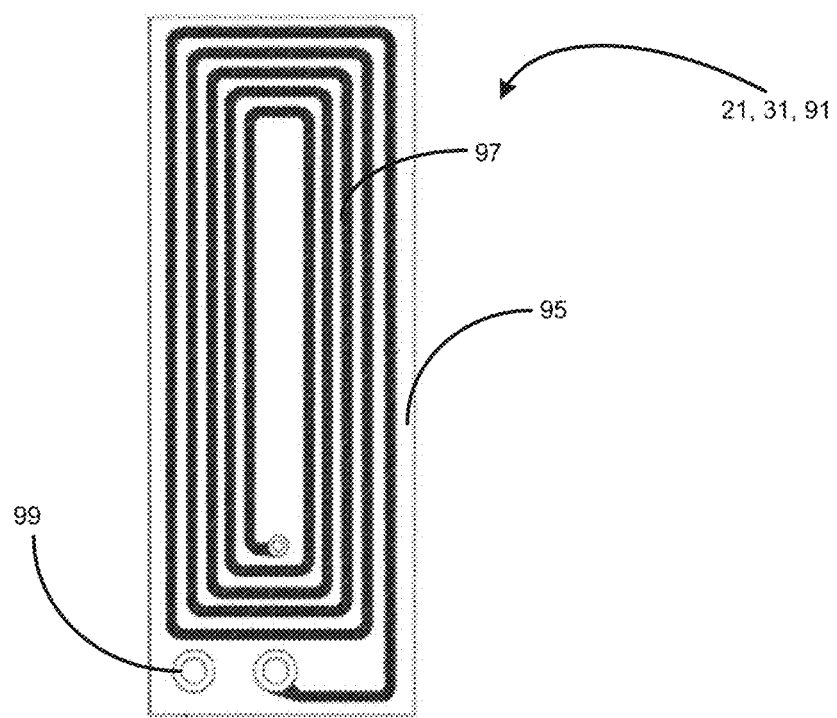
FIG. 16A is a top view of an embodiment of an antenna, for use as one or more of a transmitter antenna, a receiver antenna, and a repeater antenna of the systems of FIGS. 1-7, 9-15 and/or any other systems, methods, or apparatus disclosed herein, in accordance with the present disclosure.

FIG. 16A illustrates an example, non-limiting embodiment of one or more of the transmitter antenna 21, the receiver antenna 31, and the repeater antenna 91, which may be used with any of the systems, methods, and/or apparatus disclosed herein. In the illustrated embodiment, the antenna 21, 31, is a flat spiral coil configuration. Non-limiting examples can be found in U.S. Pat. Nos. 9,941,743, 9,960,628, 9,941,743 all to Peralta et al.; U.S. Pat. Nos. 9,948,129, 10,063,100 to Singh et al.; U.S. Pat. No. 9,941,590 to Luzinski; U.S. Pat. No. 9,960,629 to Rajagopalan et al.; and U.S. Patent App. Nos. 2017/0040107, 2017/0040105, 2017/0040688 to Peralta et al.; all of which are assigned to the assignee of the present application and incorporated fully herein by reference. The antenna 21, 31, 91 illustrated in FIG. 16A is a printed circuit board (PCB) or flexible printed circuit board (FPC) antenna, having a plurality of turns 97 of a conductor and one or more connectors 99, all disposed on a substrate 95 of the antenna 21, 31, 91. While the antenna 21, 31, 91 is illustrated, in FIG. 16A, having a certain number of turns and/or layers, the PCB or FPC antenna may include any number of turns or layers. The PCB or FPC antenna 21, 31, 91 of FIG. 16A may be produced via any known method of manufacturing PCB or FPCs known to those skilled in the art.

Figure 16B:
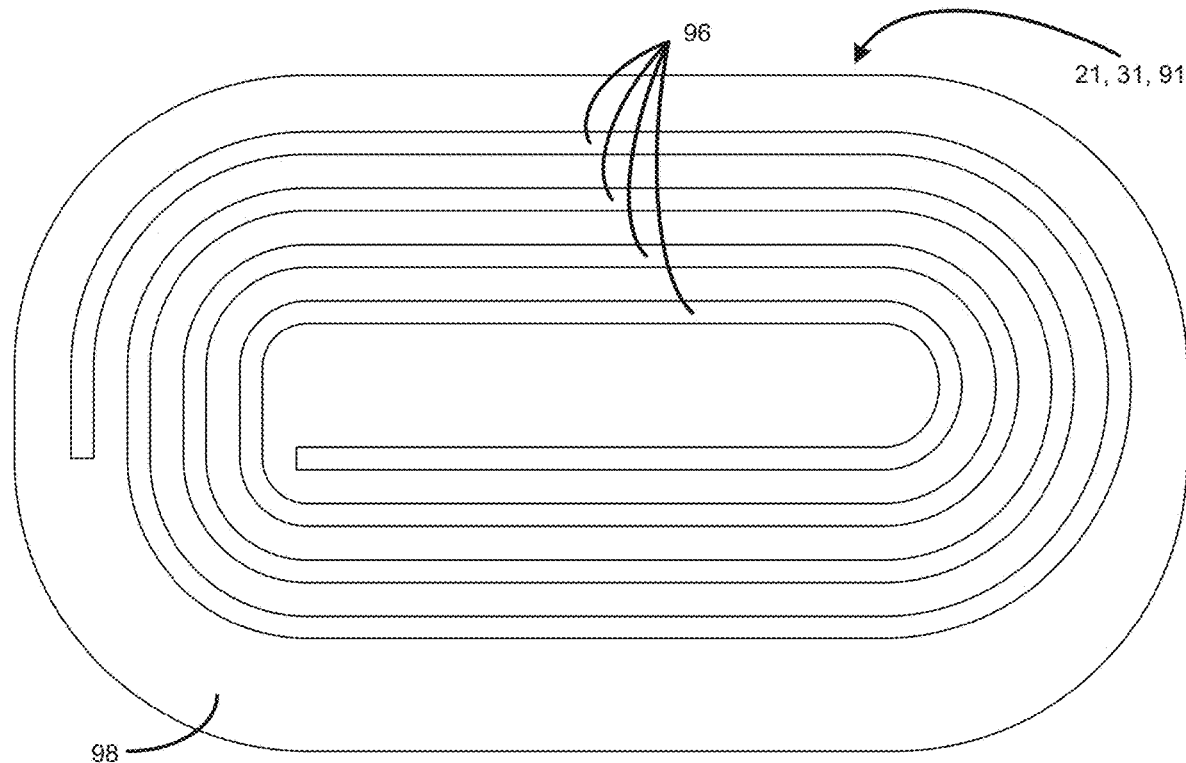
FIG. 16B is a top view of another embodiment of an antenna, for use as one or more of a transmitter antenna, a receiver antenna, and a repeater antenna of the systems of FIGS. 1-7, 9-15 and/or any other systems, methods, or apparatus disclosed herein, in accordance with the present disclosure.

In another embodiment of the antenna 21, 31, 91, illustrated in FIG. 16B, the antenna 21, 31, 91 may be a wire wound antenna, wherein the antenna is a conductive wire wound in a particular pattern and having any number of turns 96. The wire wound antenna 21, 31, 91 may be free standing within an associated structure or, in some examples, the wire wound antenna 21, 31, 91 may be either held in place or positioned using a wire holder 98.

In addition, the antenna 21, 31, 91 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, and 9,300,046 to Singh et al., all of which are assigned to the assignee of the present application are incorporated fully herein. These are merely exemplary antenna examples; however, it is contemplated that the antennas 21, 31 may be any antenna capable of the aforementioned higher power, high frequency wireless power transfer.

FIG. 17 is an example block diagram for a method 1000 of designing a system for wirelessly transferring one or more of electrical energy, electrical power, electromagnetic energy, and electronic data, in accordance with the systems, methods, and apparatus of the present disclosure. To that end, the method 1000 may be utilized to design a system in accordance with any disclosed embodiments of the system 10 and any components thereof.

At block 1200, the method 1000 includes designing a wireless transmission system for use in the system 10. The wireless transmission system designed at block 1200 may be designed in accordance with one or more of the aforementioned and disclosed embodiments of the wireless transmission system 20, in whole or in part and, optionally, including any components thereof. Block 1200 may be implemented as a method 1200 for designing a wireless transmission system.

Turning now to FIG. 18 and with continued reference to the method 1000 of FIG. 18, an example block diagram for the method 1200 for designing a wireless transmission system is illustrated. The wireless transmission system designed by the method 1200 may be designed in accordance with one or more of the aforementioned and disclosed embodiments of the wireless transmission system 20 in whole or in part and, optionally, including any components thereof. The method 1200 includes designing and/or selecting a transmitter antenna for the wireless transmission system, as illustrated in block 1210. The designed and/or selected transmitter antenna may be designed and/or selected in accordance with one or more of the aforementioned and disclosed embodiments of the transmitter antenna 21, in whole or in part and including any components thereof. The method 1200 also includes designing and/or tuning a transmission tuning system for the wireless transmission system, as illustrated in block 1220. Such designing and/or tuning may be utilized for, but not limited to being utilized for, impedance matching, as discussed in more detail above. The designed and/or tuned transmission tuning system may be designed and/or tuned in accordance with one or more of the aforementioned and disclosed embodiments of wireless transmission system 20, in whole or in part and, optionally, including any components thereof.

The method 1200 further includes designing a power conditioning system for the wireless transmission system, as illustrated in block 1230. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40, in whole or in part and, optionally, including any components thereof. Further, at block 1240, the method 1200 may involve determining and/or optimizing a connection, and any associated connection components, between the input power source 12 and the power conditioning system that is designed at block 1230. Such determining and/or optimizing may include selecting and implementing protection mechanisms and/or apparatus, selecting and/or implementing voltage protection mechanisms, among other things.

The method 1200 further includes designing and/or programing a transmission control system of the wireless transmission system of the method 1000, as illustrated in block 1250. The designed transmission control system may be designed in accordance with one or more of the aforementioned and disclosed embodiments of the transmission control system 26, in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 17, at block 1300, the method 1000 includes designing a wireless receiver system for use in the system 10. The wireless transmission system designed at block 1300 may be designed in accordance with one or more of the aforementioned and disclosed embodiments of the wireless receiver system 30 in whole or in part and, optionally, including any components thereof. Block 1300 may be implemented as a method 1300 for designing a wireless receiver system.

Turning now to FIG. 19 and with continued reference to the method 1000 of FIG. 17, an example block diagram for the method 1300 for designing a wireless receiver system is illustrated. The wireless receiver system designed by the method 1300 may be designed in accordance with one or more of the aforementioned and disclosed embodiments of the wireless receiver system 30 in whole or in part and, optionally, including any components thereof. The method 1300 includes designing and/or selecting a receiver antenna for the wireless receiver system, as illustrated in block 1310. The designed and/or selected receiver antenna may be designed and/or selected in accordance with one or more of the aforementioned and disclosed embodiments of the receiver antenna 31, in whole or in part and including any components thereof. The method 1300 includes designing and/or tuning a receiver tuning system for the wireless receiver system, as illustrated in block 1320. Such designing and/or tuning may be utilized for, but not limited to being utilized for, impedance matching, as discussed in more detail above. The designed and/or tuned receiver tuning system may be designed and/or tuned in accordance with one or more of the aforementioned and disclosed embodiments of the receiver tuning and filtering system 34 in whole or in part and/or, optionally, including any components thereof.

The method 1300 further includes designing a power conditioning system for the wireless receiver system, as illustrated in block 1330. The power conditioning system may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 1340, the method 1300 may involve determining and/or optimizing a connection, and any associated connection components, between the load 16 and the power conditioning system of block 1330. Such determining may include selecting and implementing protection mechanisms and/or apparatus, selecting and/or implementing voltage protection mechanisms, among other things.

The method 1300 further includes designing and/or programing a receiver control system of the wireless receiver system of the method 1300, as illustrated in block 1350. The designed receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 1000 of FIG. 17, the method 1000 further includes, at block 1400, optimizing and/or tuning both the wireless transmission system and the wireless receiver system for wireless power transfer. Such optimizing and/or tuning includes, but is not limited to including, controlling and/or tuning parameters of system components to match impedance, optimize and/or set voltage and/or power levels of an output power signal, among other things and in accordance with any of the disclosed systems, methods, and apparatus herein. Further, the method 1000 includes optimizing and/or tuning one or both of the wireless transmission system and the wireless receiver system for data communications, in view of system characteristics necessary for wireless power transfer. Such optimizing and/or tuning includes, but is not limited to including, optimizing power characteristics for concurrent transmission of electrical power signals and electrical data signals, tuning quality factors of antennas for different transmission schemes, among other things and in accordance with any of the disclosed systems, methods, and apparatus herein.

Figure 20:
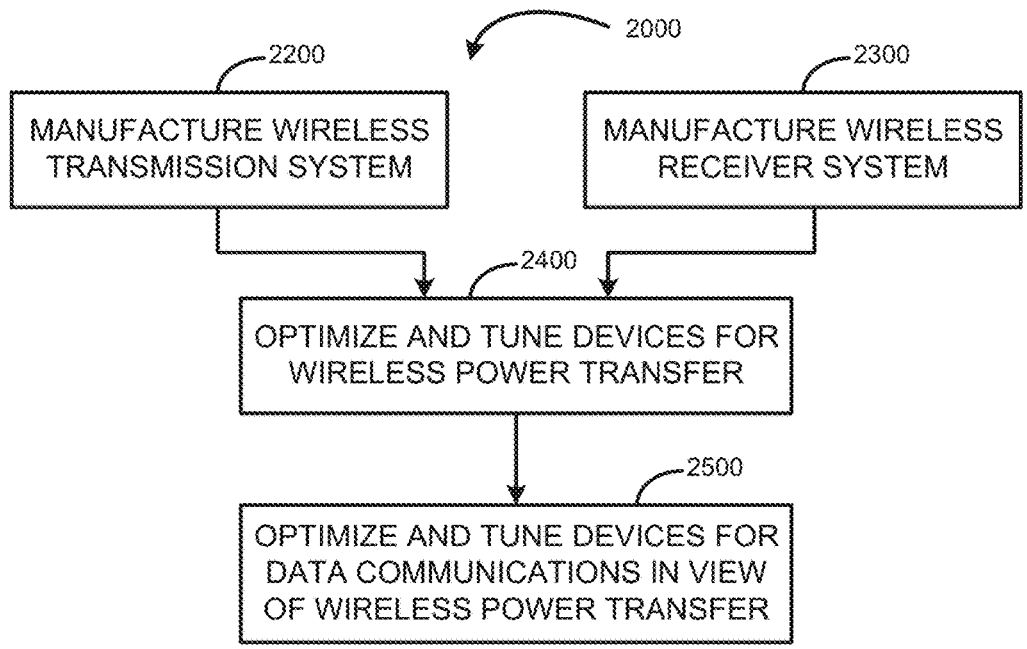
FIG. 20 is a flow chart for an exemplary method for manufacturing a system for wireless transmission of one or more of electrical energy, electrical power signals, electrical power, electrical electromagnetic energy, electronic data, and combinations thereof, in accordance with FIGS. 1-7, 9-16 and the present disclosure.

FIG. 20 is an example block diagram for a method 2000 for manufacturing a system for wirelessly transferring one or both of electrical power signals and electrical data signals, in accordance with the systems, methods, and apparatus of the present disclosure. To that end, the method 2000 may be utilized to manufacture a system in accordance with any disclosed embodiments of the system 10 and any components thereof.

At block 2200, the method 2000 includes manufacturing a wireless transmission system for use in the system 10. The wireless transmission system manufactured at block 2200 may be designed in accordance with one or more of the aforementioned and disclosed embodiments of the wireless transmission system 20 in whole or in part and, optionally, including any components thereof. Block 2200 may be implemented as a method 2200 for manufacturing a wireless transmission system.

Figures 21, 22:
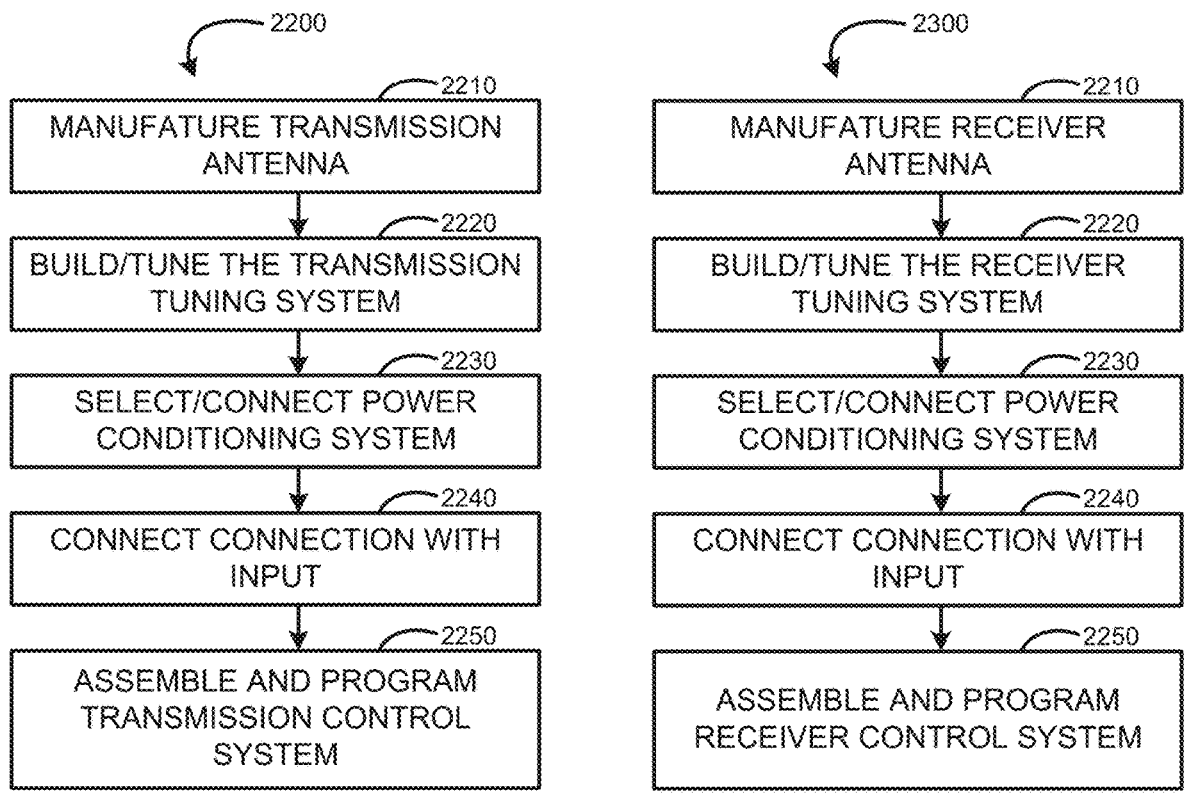
FIG. 21 is a flow chart for an exemplary method for manufacturing a wireless transmission system for the system of FIG. 20, in accordance with FIGS. 1-7, 9-17, 20, and the present disclosure.
FIG. 22 is a flow chart for an exemplary method for designing a wireless receiver system for the system of FIG. 20, in accordance with FIGS. 1-7, 9-17, 20 and the present disclosure.

Turning now to FIG. 21 and with continued reference to the method 2000 of FIG. 20, an example block diagram for the method 2200 for manufacturing a wireless transmission system is illustrated. The wireless transmission system manufactured by the method 2200 may be manufactured in accordance with one or more of the aforementioned and disclosed embodiments of the wireless transmission system 20 in whole or in part and, optionally, including any components thereof. The method 2200 includes manufacturing a transmitter antenna for the wireless transmission system, as illustrated in block 2210. The manufactured transmission system may be built and/or tuned in accordance with one or more of the aforementioned and disclosed embodiments of the transmitter antenna 21, in whole or in part and including any components thereof. The method 2200 also includes building and/or tuning a transmission tuning system for the wireless transmission system, as illustrated in block 2220. Such building and/or tuning may be utilized for, but not limited to being utilized for, impedance matching, as discussed in more detail above. The built and/or tuned transmission tuning system may be designed and/or tuned in accordance with one or more of the aforementioned and disclosed embodiments of the transmission tuning system 24, in whole or in part and, optionally, including any components thereof.

The method 2200 further includes selecting and/or connecting a power conditioning system for the wireless transmission system, as illustrated in block 2230. The power conditioning system manufactured may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40 in whole or in part and, optionally, including any components thereof. Further, at block 2240, the method 2200 involve determining and/or optimizing a connection, and any associated connection components, between the input power source 12 and the power conditioning system of block 2230. Such determining may include selecting and implementing protection mechanisms and/or apparatus, selecting and/or implementing voltage protection mechanisms, among other things.

The method 2200 further includes assembling and/or programing a transmission control system of the wireless transmission system of the method 2000, as illustrated in block 2250. The assembled transmission control system may be assembled and/or programmed in accordance with one or more of the aforementioned and disclosed embodiments of the transmission control system 26 in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 20, at block 2300, the method 2000 includes manufacturing a wireless receiver system for use in the system 10. The wireless transmission system manufactured at block 2300 may be designed in accordance with one or more of the aforementioned and disclosed embodiments of the wireless receiver system 30 in whole or in part and, optionally, including any components thereof. Block 2300 may be implemented as a method 2300 for manufacturing a wireless receiver system.

Turning now to FIG. 22 and with continued reference to the method 2000 of FIG. 20, an example block diagram for the method 2300 for manufacturing a wireless receiver system is illustrated. The wireless receiver system manufactured by the method 2300 may be designed in accordance with one or more of the aforementioned and disclosed embodiments of the wireless receiver system 30 in whole or in part and, optionally, including any components thereof. The method 2300 includes manufacturing a receiver antenna for the wireless receiver system, as illustrated in block 2310. The manufactured receiver antenna may be manufactured, designed, and/or selected in accordance with one or more of the aforementioned and disclosed embodiments of the receiver antenna 31 in whole or in part and including any components thereof. The method 2300 includes building and/or tuning a receiver tuning system for the wireless receiver system, as illustrated in block 2320. Such building and/or tuning may be utilized for, but not limited to being utilized for, impedance matching, as discussed in more detail above. The built and/or tuned receiver tuning system may be designed and/or tuned in accordance with one or more of the aforementioned and disclosed embodiments of the receiver tuning and filtering system 34 in whole or in part and, optionally, including any components thereof.

The method 2300 further includes selecting and/or connecting a power conditioning system for the wireless receiver system, as illustrated in block 2330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 2340, the method 2300 may involve determining and/or optimizing a connection, and any associated connection components, between the load 16 and the power conditioning system of block 2330. Such determining may include selecting and implementing protection mechanisms and/or apparatus, selecting and/or implementing voltage protection mechanisms, among other things.

The method 2300 further includes assembling and/or programing a receiver control system of the wireless receiver system of the method 2300, as illustrated in block 2350. The assembled receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 2000 of FIG. 20, the method 2000 further includes, at block 2400, optimizing and/or tuning both the wireless transmission system and the wireless receiver system for wireless power transfer. Such optimizing and/or tuning includes, but is not limited to including, controlling and/or tuning parameters of system components to match impedance, optimize and/or configure voltage and/or power levels of an output power signal, among other things and in accordance with any of the disclosed systems, methods, and apparatus herein. Further, the method 2000 includes optimizing and/or tuning one or both of the wireless transmission system and the wireless receiver system for data communications, in view of system characteristics necessary for wireless power transfer, as illustrated at block 2500. Such optimizing and/or tuning includes, but is not limited to including, optimizing power characteristics for concurrent transmission of electrical power signals and electrical data signals, tuning quality factors of antennas for different transmission schemes, among other things and in accordance with any of the disclosed systems, methods, and apparatus herein.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment, a ferrite shield may be incorporated within the antenna structure to improve antenna performance. Selection of the ferrite shield material may be dependent on the operating frequency as the complex magnetic permeability ($\mu=\mu'-j*\mu^-$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:

1. A wireless power receiver system operatively associated with eyewear including a load, the eyewear comprising:
   a front face;
   a first arm connected to the front face via a first hinge, the first arm comprising a first receiver antenna and a first repeater antenna, wherein the first receiver antenna and the first repeater antenna are configured to receive wireless power signals from a wireless transmission system comprising a first transmitter antenna and a second transmitter antenna, and wherein the first repeater antenna is configured to transmit first repeated wireless power signals;
   a second arm connected to the front face via a second hinge, the second arm comprising a second receiver antenna and a second repeater antenna, wherein the second receiver antenna and the second repeater antenna are configured to receive the wireless power signals from the wireless transmission system, wherein the second repeater antenna is configured to transmit second repeated wireless power signals, and wherein the first receiver antenna is configured to receive the second repeated wireless power signals and the second receiver antenna is configured to receive the first repeated wireless power signals;

wherein the first arm and the second arm are configurable to be folded inward toward the front face in at least a first folded configuration and a second folded configuration, wherein the first folded configuration comprises the first arm folded in closer proximity to the front face than the second arm, and wherein the second folded configuration comprises the second arm folded in closer proximity to the front face than the first arm, and wherein, in the first folded configuration the second receiver antenna is configured to receive first wireless power signals from the first transmitter antenna, the second repeater antenna is configured to receive second wireless power signals from the second transmitter antenna, and the first receiver antenna is configured to receive the second wireless power signals via the second repeated wireless power signals transmitted by the second repeater antenna; and wherein, in the second folded configuration the first receiver antenna is configured to receive the second wireless power signals from the second transmitter antenna, the first repeater antenna is configured to receive first wireless power signals from the first wireless transmitter antenna, and the second receiver antenna is configured to receive the first wireless power signals via the first repeated wireless power signals transmitted by the first repeater antenna.

2. The wireless power receiver system of claim 1, wherein the load comprises one or more of a display device, an audio device, a battery, a processor, or combinations thereof.

3. The wireless power receiver system of claim 1, wherein one or more of the first transmitter antenna, the first repeater antenna, the first receiver antenna, the second transmitter antenna, the second repeater antenna, or the second receiver antenna are configured to operate at an operating frequency in a range of about 13.553 MHz to about 13.567 MHz.

4. The wireless power receiver system of claim 1, wherein one or more of the first transmitter antenna, the first repeater antenna, the first receiver antenna, the second transmitter antenna, the second repeater antenna, or the second receiver antenna are configured to operate at an operating frequency in a range of about 6.78 MHz.

5. The wireless power receiver system of claim 1,
wherein the first arm extends from the first hinge to a first distal end, and the second arm extends from the second hinge to a second distal end, and
wherein the first receiver antenna is positioned adjacent to the first distal end, and the second receiver antenna is positioned adjacent the second distal end.

6. The wireless power receiver system of claim 1, wherein the first arm is a first temple for the eyewear and the second arm is a second temple for the eyewear.

7. The wireless power receiver system of claim 1, further comprising a first power conditioning system and a second power conditioning system, wherein the first power conditioning system is configured to receive one or both of the second wireless power signals or the second repeated wireless power signals, and convert one or both of the second wireless power signals or the second repeated wireless power signals to a first electrical power for provision to the load, and
wherein the second power conditioning system is configured to receive one or both of the first wireless power signals or the first repeated wireless power signals, and convert one or both of the first wireless power signals or the first repeated wireless power signals to a second electrical power for provision to the load.

8. A wireless power transfer system operatively associated with eyewear and a receptacle, the receptacle configured for mechanical interaction with the eyewear, the eyewear including a front face, a first arm, a second arm, and a load, the wireless power transfer system comprising:
a wireless transmission system operatively associated with the receptacle, the wireless transmission system configured to transmit wireless power signals, the wireless transmission system comprising a first transmitter antenna and a second transmitter antenna;
a first wireless receiver system configured to receive the wireless power signals from the wireless transmission system, the first wireless receiver system comprising:
a first repeater antenna positioned on or within the first arm, the first repeater antenna configured to receive the wireless power signals from the wireless transmission system and transmit first repeated wireless power signals, and
a first receiver antenna positioned on or within the first arm;
a second wireless receiver system configured to receive the wireless power signals from the wireless transmission system, the second wireless receiver system comprising:
a second repeater antenna positioned on or within the second arm, the second repeater antenna configured to receive the wireless power signals from the wireless transmission system and transmit second repeated wireless power signals,
a second receiver antenna positioned on or within the second arm;
wherein the first receiver antenna is configured to receive one or both of the wireless power signals from the wireless transmission system or the second repeated wireless power signals from the second repeater antenna and the second receiver antenna is configured to receive one or both of the wireless power signals from the wireless transmission system or the first repeated wireless power signals from the first repeater antenna;
wherein the first arm and the second arm are configurable to be folded inward toward the front face in at least a first folded configuration and a second folded configuration, wherein the first folded configuration comprises the first arm folded in closer proximity to the front face than the second arm, and wherein the second folded configuration comprises the second arm folded in closer proximity to the front face than the first arm, and
wherein, in the first folded configuration the second receiver antenna is configured to receive first wireless power signals from the first transmitter antenna, the second repeater antenna is configured to receive second wireless power signals from the second transmitter antenna, and the first receiver antenna is configured to receive the second wireless power signals via the second repeated wireless power signals transmitted by the second repeater antenna; and wherein, in the second folded configuration the first receiver antenna is configured to receive the second wireless power signals from the second transmitter antenna, the first repeater antenna is configured to receive the first wireless power signals from the first wireless transmitter antenna, and the second receiver antenna is configured to receive the first wireless power signals via the first repeated wireless power signals transmitted by the first repeater antenna.

9. The wireless power transfer system of claim 8, wherein the receptacle includes one or more mechanical features, the one or more mechanical features configured for mechanically receiving the eyewear, and
wherein the wireless transmission system is configured to transmit the wireless power signals to the first wireless receiver system and the second wireless receiver system when the eyewear is mechanically received by the one or more mechanical features.

10. The wireless power transfer system of claim 9, wherein the receptacle comprises one of a case, a pouch, a holder, or a stand.

11. The wireless power transfer system of claim 8, wherein the load comprises one or more of a display device, an audio device, a battery, a processor, or combinations thereof.

12. The wireless power transfer system of claim 8, wherein one or more of the first transmitter antenna, the first repeater antenna, the first receiver antenna, the second transmitter antenna, the second repeater antenna, or the second receiver antenna are configured to operate at an operating frequency in a range of about 13.553 MHz to about 13.567 MHz.

13. The wireless power transfer system of claim 8, wherein one or more of the first transmitter antenna, the first repeater antenna, the first receiver antenna, the second transmitter antenna, the second repeater antenna, or the second receiver antenna are configured to operate at an operating frequency in a range of about 6.78 MHz.

14. The wireless power transfer system of claim 8,
wherein the first arm extends from a first hinge to a first distal end, and the second arm extends from a second hinge to a second distal end, and
wherein the first receiver antenna is positioned adjacent to the first distal end, and the second receiver antenna is positioned adjacent the second distal end.

15. A wireless receiver system operatively associated with eyewear, the wireless receiver system configured to receive wireless power signals from a wireless transmission system comprising a first transmitter antenna and a second transmitter antenna, the eyewear including a front face, a first arm, a second arm, and a load, the wireless receiver system comprising:
a first repeater antenna positioned on or within the first arm, the first repeater antenna configured to receive the wireless power signals from the wireless transmission system and transmit first repeated wireless power signals, and
a first receiver antenna positioned on or within the first arm; and
a second wireless receiver system configured to receive the wireless power signals from the wireless transmission system, the second wireless receiver system comprising:
a second repeater antenna positioned on or within the second arm, the second repeater antenna configured to receive the wireless power signals from the wireless transmission system and transmit second repeated wireless power signals, and
a second receiver antenna positioned on or within the second arm;
wherein the first receiver antenna is configured to receive one or both of the wireless power signals from the wireless transmission system or the second repeated wireless power signals from the second repeater antenna and the second receiver antenna is configured to receive one or both of the wireless power signals from the wireless transmission system or the first repeated wireless power signals from the first repeater antenna.

16. The wireless receiver system of claim 15, wherein the load comprises one or more of a display device, an audio device, a battery, a processor, or combinations thereof.

17. The wireless receiver system of claim 15, wherein one or more of the first transmitter antenna, the first repeater antenna, the first receiver antenna, the second transmitter antenna, the second repeater antenna, or the second receiver antenna are configured to operate at an operating frequency in a range of about 13.553 MHz to about 13.567 MHz.

18. The wireless receiver system of claim 15, wherein one or more of the first transmitter antenna, the first repeater antenna, the first receiver antenna, the second transmitter antenna, the second repeater antenna, or the second receiver antenna are configured to operate at an operating frequency in a range of about 6.78 MHz.

\* \* \* \* \*